(12) United States Patent
Huang et al.

(10) Patent No.: US 12,335,182 B2
(45) Date of Patent: Jun. 17, 2025

(54) SIGNAL TRANSMISSION METHOD AND APPARATUS, AND STORAGE MEDIUM

(71) Applicant: DATANG MOBILE COMMUNICATIONS EQUIPMENT CO., LTD., Beijing (CN)

(72) Inventors: Qiuping Huang, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 275 days.

(21) Appl. No.: 18/020,079

(22) PCT Filed: Aug. 5, 2021

(86) PCT No.: PCT/CN2021/110721
§ 371 (c)(1),
(2) Date: Feb. 6, 2023

(87) PCT Pub. No.: WO2022/028501
PCT Pub. Date: Feb. 10, 2022

(65) Prior Publication Data
US 2023/0308234 A1  Sep. 28, 2023

(30) Foreign Application Priority Data
Aug. 7, 2020  (CN) .......................... 202010791708.9

(51) Int. Cl.
*H04L 5/00* (2006.01)
*H04B 7/06* (2006.01)
*H04W 28/02* (2009.01)

(52) U.S. Cl.
CPC ......... *H04L 5/0048* (2013.01); *H04B 7/0602* (2013.01); *H04W 28/0215* (2013.01)

(58) Field of Classification Search
CPC ......... H04W 28/0215; H04W 28/0226; H04W 28/0231; H04W 28/0273; H04W 28/0289;
(Continued)

(56) References Cited

U.S. PATENT DOCUMENTS

2012/0113869 A1  5/2012  Gaal et al.
2019/0174466 A1  6/2019  Zhang et al.
(Continued)

FOREIGN PATENT DOCUMENTS

CN  109923828 A  6/2019
CN  110474734 A  11/2019
(Continued)

OTHER PUBLICATIONS

Nokia, "Introduction of NR enhanced MIMO", 3GPP TSG-RAN WG1 Meeting #99, Reno, USA, Nov. 18-22, 2019, total 51 pages, R1-1913655.
(Continued)

*Primary Examiner* — Phong La
(74) *Attorney, Agent, or Firm* — KILPATRICK TOWNSEND & STOCKTON LLP

(57) ABSTRACT

Provided are a signal transmission method and apparatus, and a storage medium. The method includes determining a first determination mode and/or a second determination mode, and the first determination mode is a mode for determining first SRS transmission corresponding to an uplink signal, and the second determination method is a mode for determining a first antenna port corresponding to the uplink signal; and transmitting the first determination mode and/or the second determination mode to a UE, and the UE determines the first SRS transmission according to the first determination mode, and/or determines the first antenna port according to the second determination mode, (Continued)

and transmits the uplink signal according to the first SRS transmission and/or the first antenna port.

18 Claims, 6 Drawing Sheets

(58) Field of Classification Search
CPC ............ H04W 28/0252; H04L 5/0048; H04L 5/0058; H04L 5/0053; H04L 5/0042; H04L 5/003; H04B 7/0602; H04B 7/0686; H04B 7/0613
See application file for complete search history.

(56) References Cited

U.S. PATENT DOCUMENTS

| | | | | |
|---|---|---|---|---|
| 2019/0254076 | A1* | 8/2019 | Siomina | H04W 76/27 |
| 2020/0067739 | A1* | 2/2020 | Tang | H04L 5/0048 |
| 2020/0112349 | A1* | 4/2020 | Yang | H04B 7/0404 |
| 2020/0162214 | A1* | 5/2020 | Tang | H04L 5/0051 |
| 2020/0204406 | A1* | 6/2020 | Zhang | H04B 7/0456 |
| 2020/0404593 | A1* | 12/2020 | Yao | H04L 25/0226 |
| 2021/0314873 | A1* | 10/2021 | Huang | H04W 52/42 |
| 2022/0021420 | A1* | 1/2022 | Liu | H04B 7/0413 |
| 2022/0416857 | A1* | 12/2022 | Fan | H04B 7/0456 |
| 2023/0308234 | A1* | 9/2023 | Huang | H04W 28/0215 |
| 2023/0422337 | A1* | 12/2023 | Sun | H04L 5/0035 |

FOREIGN PATENT DOCUMENTS

| | | |
|---|---|---|
| CN | 111092708 A | 5/2020 |
| WO | 2018170690 A1 | 9/2018 |
| WO | 2019153224 A1 | 8/2019 |
| WO | 2019217891 A1 | 11/2019 |

OTHER PUBLICATIONS

European Patent Office, Extended European Search Report Issued in Application No. 21854129.0, Oct. 8, 2024 Germany, 8 pages.

* cited by examiner

SIGNAL TRANSMISSION METHOD AND APPARATUS, AND STORAGE MEDIUM

CROSS-REFERENCE TO RELATED APPLICATION

The present application is a National Stage of International Application No. PCT/CN2021/110721, filed on Aug. 5, 2021, which claims priority to Chinese patent application No. 202010791708.9, filed on Aug. 7, 2020, entitled "Signal Transmission Method and Apparatus, and Storage Medium", which are hereby incorporated by reference in their entireties.

FIELD

The present application relates to the field of communications, and in particular, to signal transmission methods and apparatuses, and a storage medium.

BACKGROUND

In wireless communication system, sounding reference signal (SRS) transmission method is common and has advantage of stable transmission performance.

The traditional signal transmission in wireless communication is easy to cause signal blockage, which limits the flexibility of configuring and triggering an SRS resource, and reduces the transmission performance.

Therefore, how to solve the defects of inflexible transmission scheme and low flexibility of configuring and triggering the SRS resource caused by the scheme of only one uplink signal antenna port and/or SRS transmission, and ensure the transmission performance is an urgent problem that needs to be solved currently.

SUMMARY

Embodiments of the present application provide signal transmission methods and apparatuses, and a storage medium, to solve the defects of inflexible transmission scheme and low flexibility of configuring and triggering an SRS resource caused by the scheme of only one uplink signal antenna port and/or SRS transmission, reduce network congestion degree, and improve flexibility of signal transmission.

A signal transmission method according to an embodiment of the present application, includes: determining a first determination mode and/or a second determination mode, where the first determination mode is a mode for determining a first sounding reference signal (SRS) transmission corresponding to an uplink signal, and the second determination mode is a mode for determining a first antenna port corresponding to the uplink signal; and transmitting the first determination mode and/or the second determination mode to a terminal (such as a user equipment (UE)), the first determination mode is used for determining the first SRS transmission and/or the second determination mode is used for determining the first antenna port and the uplink signal is transmitted according to the first SRS transmission and/or the first antenna port.

In an embodiment, according to the signal transmission method of the present application, the first SRS transmission is one or more SRS transmissions of a given SRS resource; where the given SRS resource is an SRS resource indicated by SRS resource indication information in scheduling information for the uplink signal.

In an embodiment, according to the signal transmission method of the present application, the first determination mode includes:
determining the first SRS transmission according to one or more SRS transmissions of a first SRS resource set and/or one or more SRS transmissions of a second SRS resource set; or
determining a second SRS transmission, and taking the second SRS transmission as the first SRS transmission; or
determining one or more SRS transmissions of a third SRS resource set as the first SRS transmission;
where the first SRS resource set is an SRS resource set with a given type that unmatched with a transmission mode of the uplink signal;
the second SRS resource set is an SRS resource set matched with the transmission mode of the uplink signal;
the second SRS transmission is the most recent SRS transmission of an SRS resource indicated by an SRS resource indicator (SRI) in downlink control information (DCI), where the SRS resource is prior to a physical downlink control channel (PDCCH) carrying the DCI which schedules the uplink signal; and
the third SRS resource set is an SRS resource set indicated by SRS resource set indication information transmitted by a network device.

In an embodiment, according to the signal transmission method of the present application, the determining the first SRS transmission according to one or more SRS transmissions of the first SRS resource set and/or one or more SRS transmissions of the second SRS resource set includes one or more of:
determining the first SRS transmission from the one or more SRS transmissions of the first SRS resource set in case that the network device configures the first SRS resource set and the second SRS resource set for the UE simultaneously; or
determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources; or
determining a third SRS transmission, and taking the third SRS transmission as the first SRS transmission; or
determining a fourth SRS transmission, and taking the fourth SRS transmission as the first SRS transmission;
where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and
the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, according to the signal transmission method of the present application, the second determination mode includes:
determining the first antenna port according to an antenna port for one or more SRS transmissions of a fourth SRS resource set and/or an antenna port for one or more SRS transmissions of a fifth SRS resource set; or determining an antenna port for a fifth SRS transmission, and taking the antenna port for the fifth SRS transmission as the first antenna port; or taking an antenna port for one or more SRS transmissions of a sixth SRS resource set as the first antenna port;

where the fourth SRS resource set is an SRS resource set with a given type that unmatched with a transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is an SRS resource set indicated by SRS resource set indication information transmitted by a network device.

In an embodiment, according to the signal transmission method of the present application, the determining the first antenna port according to the antenna port for one or more SRS transmissions of the fourth SRS resource set and/or the antenna port for one or more SRS transmissions of the fifth SRS resource set includes one or more of:

determining the first antenna port from the antenna port for the one or more SRS transmissions of the fourth SRS resource set in case that the network device configures the fourth SRS resource set and the fifth SRS resource set for the UE simultaneously; or determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources;

determining an antenna port for a sixth SRS transmission, and taking the antenna port for the sixth SRS transmission as the first antenna port; or determining an antenna port for a seventh SRS transmission, and taking the antenna port for the seventh SRS transmission as the first antenna port;

where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the signal transmission method of the present application, the transmission mode of the uplink signal includes a codebook based transmission scheme and/or a non-codebook based transmission scheme;

an SRS resource set matched with the codebook based transmission scheme is an SRS resource set with usage set to codebook; and an SRS resource set matched with the non-codebook based transmission scheme is an SRS resource set with usage set to non-codebook.

In an embodiment, according to the signal transmission method of the present application, the transmitting the first determination mode and/or the second determination mode to the UE includes:

transmitting the first determination mode and/or the second determination mode to the UE through a first indication signaling;

the signal transmission method further includes:

determining first information for indicating SRS resource set; and transmitting the first information to the UE through the first indication signaling or second indication signaling, where the second indication signaling is different from the first indication signaling;

where the first indication signaling includes:

the first information; and the first determination mode and/or the second determination mode; where the first determination mode includes: the first SRS transmission is one or more SRS transmissions of an SRS resource set indicated by the first information; the second determination mode includes: the first antenna port is an antenna port for one or more SRS transmission of the SRS resource set indicated by the first information.

In an embodiment, the signal transmission method of the present application further includes:

transmitting third indication information to the UE, where the third indication information is used for indicating a bit width of SRI information;

where the SRI is used for indicating SRS resource for the first SRS transmission and/or SRS resource for the first antenna port.

In an embodiment, according to the signal transmission method of the present application, the bit width is determined by the network device according to the number of SRS resources included in a seventh SRS resource set;

where the seventh SRS resource set includes all SRS resource sets for determining the first SRS transmission.

In an embodiment, the signal transmission method of the present application further includes:

receiving UE capability information transmitted by the UE; and determining the first determination mode and/or the second determination mode according to the UE capability information.

A signal transmission method according to an embodiment of the present application, includes:

receiving a first determination mode and/or a second determination mode transmitted by a network device, where the first determination mode is a mode for determining a first sounding reference signal (SRS) transmission corresponding to an uplink signal, and the second determination mode is a mode for determining a first antenna port corresponding to the uplink signal;

determining the first SRS transmission according to the first determination mode, and/or determining the first antenna port according to the second determination mode; and transmitting the uplink signal according to the first SRS transmission and/or the first antenna port.

In an embodiment, according to the signal transmission method of the present application, the first SRS transmission is one or more SRS transmissions of a given SRS resource; where the given SRS resource is an SRS resource indicated by SRS resource indication information in scheduling information for the uplink signal.

In an embodiment, according to the signal transmission method of the present application, the determining the first SRS transmission according to the first determination mode includes:

determining the first SRS transmission according to one or more SRS transmissions of a first SRS resource set and/or one or more SRS transmissions of a second SRS resource set; or determining a second SRS transmission, and taking the second SRS transmission as the first SRS transmission; or determining one or more SRS transmissions of a third SRS resource set as the first SRS transmission;

where the first SRS resource set is an SRS resource set with a given type that unmatched with a transmission mode of the uplink signal;

the second SRS resource set is an SRS resource set matched with the transmission mode of the uplink signal;

the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and the third SRS resource set is an SRS resource set indicated by SRS resource set indication information transmitted by the network device.

In an embodiment, according to the signal transmission method of the present application, the determining the first SRS transmission according to one or more SRS transmissions of the first SRS resource set and/or one or more SRS transmissions of the second SRS resource set includes one or more of:

determining the first SRS transmission from the one or more SRS transmissions of the first SRS resource set in case that the network device configures no second SRS resource set for the UE; or determining the first SRS transmission from the one or more SRS transmissions of the first SRS resource set in case that the network device configures the first SRS resource set and the second SRS resource set for the UE simultaneously; or determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources; or determining a third SRS transmission, and taking the third SRS transmission as the first SRS transmission; or determining a fourth SRS transmission, and taking the fourth SRS transmission as the first SRS transmission;

where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, according to the signal transmission method of the present application, the determining the first antenna port according to the second determination mode includes:

determining the first antenna port according to an antenna port for one or more SRS transmissions of a fourth SRS resource set and/or an antenna port for one or more SRS transmissions of a fifth SRS resource set; or determining an antenna port for a fifth SRS transmission, and taking the antenna port for the fifth SRS transmission as the first antenna port; or determining an antenna port for one or more SRS transmissions of a sixth SRS resource set as the first antenna port;

where the fourth SRS resource set is an SRS resource set with a given type that unmatched with a transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is an SRS resource set indicated by SRS resource set indication information transmitted by a network device.

In an embodiment, according to the signal transmission method of the present application, the determining the first antenna port according to the antenna port for one or more SRS transmissions of the fourth SRS resource set and/or the antenna port for one or more SRS transmissions of the fifth SRS resource set includes:

determining the first antenna port from the antenna port for the one or more SRS transmissions of the fourth SRS resource set in case that the network device configures no fifth SRS resource set for the UE; or determining the first antenna port from the antenna port for the one or more SRS transmissions of the fourth SRS resource set in case that the network device configures the fourth SRS resource set and the fifth SRS resource set for the UE simultaneously; or determining the first antenna port from the antenna port for the one or more SRS transmissions of the fifth SRS resource set in case that the network device configures no fourth SRS resource set for the UE; or determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources; or determining an antenna port for a sixth SRS transmission, and taking the antenna port for the sixth SRS transmission as the first antenna port; or determining an antenna port for a seventh SRS transmission, and taking the antenna port for the seventh SRS transmission as the first antenna port;

where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the signal transmission method of the present application, the transmission mode of the uplink signal includes a codebook based transmission scheme and/or a non-codebook based transmission scheme;
an SRS resource set matched with the codebook based transmission scheme is an SRS resource set with usage set to codebook; and
an SRS resource set matched with the non-codebook based transmission scheme is an SRS resource set with usage set to non-codebook.

In an embodiment, according to the signal transmission method of the present application, the receiving the first determination mode and/or the second determination mode transmitted by the network device includes:
receiving the first determination mode and/or the second determination mode transmitted by the network device through a first indication signaling;
the signal transmission method further includes:
receiving first information for indicating SRS resource set transmitted by the network device through the first indication signaling or second indication signaling, where the second indication signaling is different from the first indication signaling;
where the first indication signaling includes:
the first information; and
the first determination mode and/or the second determination mode; where the first determination mode includes: the first SRS transmission is one or more SRS transmissions of an SRS resource set indicated by the first information; the second determination mode includes: the first antenna port is an antenna port for one or more transmissions of the SRS resource set indicated by the first information.

In an embodiment, the signal transmission method of the present application further includes:
receiving third indication information transmitted by the network device, where the third indication information is used for indicating a bit width of SRI information; and
determining the bit width of the SRI information according to the third indication information;
where the SRI is used for indicating SRS resource for the first SRS transmission and/or SRS resource for the first antenna port.

In an embodiment, according to the signal transmission method of the present application, the bit width is determined by the network device according to the number of SRS resources included in a seventh SRS resource set;
where the seventh SRS resource set includes all SRS resource sets for determining the first SRS transmission.

In an embodiment, the signal transmission method of the present application further includes:
determining UE capability information; and
transmitting the UE capability information to the network device, where the UE capability information is used for determining the first determination mode and/or the second determination mode for the network device.

A signal transmission apparatus according to an embodiment of the present application, including: a memory, a transceiver and a processor:
the memory is configured to store a computer program;
the transceiver is configured to transmit and receive data under a control of the processor; and the processor is configured to read the computer program in the memory and perform the following operations of:
determining a first determination mode and/or a second determination mode, where the first determination mode is a mode for determining a first sounding reference signal (SRS) transmission corresponding to an uplink signal, and the second determination mode is a mode for determining a first antenna port corresponding to the uplink signal; and
transmitting the first determination mode and/or the second determination mode to a user equipment (UE), the first determination mode is used for determining the first SRS transmission and/or the second determination mode is used for determining the first antenna port and the uplink signal is transmitted according to the first SRS transmission and/or the first antenna port.

In an embodiment, according to the signal transmission apparatus of the present application, the first SRS transmission is one or more SRS transmissions of a given SRS resource; where the given SRS resource is an SRS resource indicated by SRS resource indication information in scheduling information for the uplink signal.

In an embodiment, according to the signal transmission apparatus of the present application, the first determination mode includes:
determining the first SRS transmission according to one or more SRS transmissions of a first SRS resource set and/or one or more SRS transmissions of a second SRS resource set; or
determining a second SRS transmission, and taking the second SRS transmission as the first SRS transmission; or
determining one or more SRS transmissions of a third SRS resource set as the first SRS transmission;
where the first SRS resource set is an SRS resource set with a given type that unmatched with a transmission mode of the uplink signal;
the second SRS resource set is an SRS resource set matched with the transmission mode of the uplink signal;
the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and
the third SRS resource set is an SRS resource set indicated by SRS resource set indication information transmitted by a network device.

In an embodiment, according to the signal transmission apparatus of the present application, the determining the first SRS transmission according to one or more SRS transmissions of the first SRS resource set and/or one or more SRS transmissions of the second SRS resource set includes one or more of:
determining the first SRS transmission from the one or more SRS transmissions of the first SRS resource set in case that the network device configures the first SRS resource set and the second SRS resource set for the UE simultaneously; or
determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources; or
determining a third SRS transmission, and taking the third SRS transmission as the first SRS transmission; or
determining a fourth SRS transmission, and taking the fourth SRS transmission as the first SRS transmission;
where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, according to the signal transmission apparatus of the present application, the second determination mode includes:

determining the first antenna port according to an antenna port for one or more SRS transmissions of a fourth SRS resource set and/or an antenna port for one or more SRS transmissions of a fifth SRS resource set; or determining an antenna port for a fifth SRS transmission, and taking the antenna port for the fifth SRS transmission as the first antenna port; or taking an antenna port for one or more SRS transmissions of a sixth SRS resource set as the first antenna port;

where the fourth SRS resource set is an SRS resource set with a given type that unmatched with a transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is an SRS resource set indicated by SRS resource set indication information transmitted by the network device.

In an embodiment, according to the signal transmission apparatus of the present application, the determining the first antenna port according to the antenna port for one or more SRS transmissions of the fourth SRS resource set and/or the antenna port for one or more SRS transmissions of the fifth SRS resource set includes one or more of:

determining the first antenna port from the antenna port for the one or more SRS transmissions of the fourth SRS resource set in case that the network device configures the fourth SRS resource set and the fifth SRS resource set for the UE simultaneously; or determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources;

determining an antenna port for a sixth SRS transmission, and taking the antenna port for the sixth SRS transmission as the first antenna port; or determining an antenna port for a seventh SRS transmission, and taking the antenna port for the seventh SRS transmission as the first antenna port;

where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the signal transmission apparatus of the present application, the transmission mode of the uplink signal includes a codebook based transmission scheme and/or a non-codebook based transmission scheme;

an SRS resource set matched with the codebook based transmission scheme is an SRS resource set with usage set to codebook; and an SRS resource set matched with the non-codebook based transmission scheme is an SRS resource set with usage set to non-codebook.

In an embodiment, according to the signal transmission apparatus of the present application, the transmitting the first determination mode and/or the second determination mode to the UE includes:

transmitting the first determination mode and/or the second determination mode to the UE through a first indication signaling;

the processor further performs the following operations of:

determining first information for indicating SRS resource set; and transmitting the first information to the UE through the first indication signaling or second indication signaling, where the second indication signaling is different from the first indication signaling;

where the first indication signaling includes:

the first information; and the first determination mode and/or the second determination mode; where the first determination mode includes: the first SRS transmission is one or more SRS transmissions of an SRS resource set indicated by the first information; the second determination mode includes: the first antenna port is an antenna port for one or more SRS transmissions of the SRS resource set indicated by the first information.

In an embodiment, the signal transmission apparatus of the present application further includes:

transmitting third indication information to the UE, where the third indication information is used for indicating a bit width of SRI information;

where the SRI is used for indicating SRS resource for the first SRS transmission and/or SRS resource for the first antenna port.

In an embodiment, according to the signal transmission apparatus of the present application, the bit width is determined by the network device according to the number of SRS resources included in a seventh SRS resource set;

where the seventh SRS resource set includes all SRS resource sets for determining the first SRS transmission.

In an embodiment, the signal transmission apparatus of the present application further includes:

receiving UE capability information transmitted by the UE; and determining the first determination mode and/or the second determination mode according to the UE capability information.

A signal transmission apparatus according to an embodiment of the present application, including: a memory, a transceiver and a processor:

the memory is configured to store a computer program; the transceiver is configured to transmit and receive data under a control of the processor; and the processor is configured to read the computer program in the memory and perform the following operations of:

receiving a first determination mode and/or a second determination mode transmitted by a network device, where the first determination mode is a mode for determining a first sounding reference signal (SRS) transmission corresponding to an uplink signal, and the second determination mode is a mode for determining a first antenna port corresponding to the uplink signal;

determining the first SRS transmission according to the first determination mode, and/or determining the first antenna port according to the second determination mode; and transmitting the uplink signal according to the first SRS transmission and/or the first antenna port.

In an embodiment, according to the signal transmission apparatus of the present application, the first SRS transmission is one or more SRS transmissions of a given SRS resource; where the given SRS resource is an SRS resource indicated by SRS resource indication information in scheduling information for the uplink signal.

In an embodiment, according to the signal transmission apparatus of the present application, the determining the first SRS transmission according to the first determination mode includes:

determining the first SRS transmission according to one or more SRS transmissions of a first SRS resource set and/or one or more SRS transmissions of a second SRS resource set; or determining a second SRS transmission, and taking the second SRS transmission as the first SRS transmission; or determining one or more SRS transmissions of a third SRS resource set as the first SRS transmission;

where the first SRS resource set is an SRS resource set with a given type that unmatched with a transmission mode of the uplink signal;

the second SRS resource set is an SRS resource set matched with the transmission mode of the uplink signal;

the second SRS transmission is the most recent SRS transmission of an SRS resource indicated by SRI in downlink control information (DCI), where the SRS resource is prior to a physical downlink control channel (PDCCH) carrying the DCI which schedules the uplink signal; and the third SRS resource set is an SRS resource set indicated by SRS resource set indication information transmitted by the network device.

In an embodiment, according to the signal transmission apparatus of the present application, the determining the first SRS transmission according to one or more SRS transmissions of the first SRS resource set and/or one or more SRS transmissions of the second SRS resource set includes one or more of:

determining the first SRS transmission from one or more SRS transmissions of the first SRS resource set in case that the network device configures no second SRS resource set for the UE; or determining the first SRS transmission from the one or more SRS transmissions of the first SRS resource set in case that the network device configures the first SRS resource set and the second SRS resource set for the UE simultaneously; or determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources; or determining a third SRS transmission, and taking the third SRS transmission as the first SRS transmission; or determining a fourth SRS transmission, and taking the fourth SRS transmission as the first SRS transmission;

where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, according to the signal transmission apparatus of the present application, the determining the first antenna port according to the second determination mode includes:

determining the first antenna port according to an antenna port for one or more SRS transmissions of a fourth SRS resource set and/or an antenna port for one or more SRS transmissions of a fifth SRS resource set; or determining an antenna port for a fifth SRS transmission, and taking the antenna port for the fifth SRS transmission as the first antenna port; or determining an antenna port for one or more SRS transmissions of a sixth SRS resource set as the first antenna port;

where the fourth SRS resource set is an SRS resource set with a given type that unmatched with a transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is an SRS resource set indicated by SRS resource set indication information transmitted by a network device.

In an embodiment, according to the signal transmission apparatus of the present application, the determining the first antenna port according to the antenna port for one or more SRS transmissions of the fourth SRS resource set and/or the antenna port for one or more SRS transmissions of the fifth SRS resource set includes:

determining the first antenna port from the antenna port for the one or more SRS transmissions of the fourth SRS resource set in case that the network device configures no fifth SRS resource set for the UE; or determining the first antenna port from the antenna port for the one or more SRS transmissions of the fourth SRS resource set in case that the network device configures the fourth SRS resource set and the fifth SRS resource set for the UE simultaneously; or determining the first antenna port from the antenna port for the one or more SRS transmissions of the fifth SRS resource set in case that the network device configures no fourth SRS resource set for the UE; or determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources; or determining an antenna port for a sixth SRS transmission, and taking the antenna port for the sixth SRS transmission as the first antenna port; or determining an antenna port for a seventh SRS transmission, and taking the antenna port for the seventh SRS transmission as the first antenna port;

where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the signal transmission apparatus of the present application, the transmission mode of the uplink signal includes a codebook based transmission scheme and/or a non-codebook based transmission scheme;

an SRS resource set matched with the codebook based transmission scheme is an SRS resource set with usage set to codebook; and an SRS resource set matched with the non-codebook based transmission scheme is an SRS resource set with usage set to non-codebook.

In an embodiment, according to the signal transmission apparatus of the present application, the receiving the first determination mode and/or the second determination mode transmitted by the network device includes:

receiving the first determination mode and/or the second determination mode transmitted by the network device through a first indication signaling;

the processor further performs the following operations of:

receiving first information for indicating SRS resource set transmitted by the network device through the first indication signaling or second indication signaling, where the second indication signaling is different from the first indication signaling;

where the first indication signaling includes:

the first information; and the first determination mode and/or the second determination mode; where the first determination mode includes: the first SRS transmission is one or more SRS transmissions of an SRS resource set indicated by the first information; the second determination mode includes: the first antenna port is an antenna port for one or more SRS transmissions of the SRS resource set indicated by the first information.

In an embodiment, the signal transmission apparatus of the present application further includes:

receiving third indication information transmitted by the network device, where the third indication information is used for indicating a bit width of SRI information; and determining the bit width of the SRI information according to the third indication information;

where the SRI is used for indicating SRS resource for the first SRS transmission and/or SRS resource for the first antenna port.

In an embodiment, according to the signal transmission apparatus of the present application, the bit width is determined by the network device according to the number of SRS resources included by all SRS resource sets for determining the first SRS transmission.

In an embodiment, the signal transmission apparatus of the present application further includes:

determining UE capability information; and transmitting the UE capability information to the network device, where the UE capability information is used for determining the first determination mode and/or the second determination mode for the network device.

A signal transmission apparatus according to an embodiment of the present application, applying to a network device and including:

a determining device, configured to determine a first determination mode and/or a second determination mode, where the first determination mode is a mode for determining a first sounding reference signal (SRS) transmission corresponding to an uplink signal, and the second determination mode is a mode for determining a first antenna port corresponding to the uplink signal; and a first transmitting device, configured to transmit the first determination mode and/or the second determination mode to a user equipment (UE), the first determination mode is used for determining the first SRS transmission and/or the second determination mode is used for determining the first antenna port and the uplink signal is transmitted according to the first SRS transmission and/or the first antenna port.

A signal transmission apparatus according to an embodiment of the present application, applying to a UE and including:

a receiving device, configured to receive a first determination mode and/or a second determination mode transmitted by a network device, where the first determination mode is a mode for determining a first sounding reference signal (SRS) transmission corresponding to an uplink signal, and the second determination mode is a mode for determining a first antenna port corresponding to the uplink signal;

a determining device, configured to determine the first SRS transmission according to the first determination mode, and/or determine the first antenna port according to the second determination mode; and a second transmitting device, configured to transmit the uplink signal according to the first SRS transmission and/or the first antenna port.

A non-transitory computer-readable storage medium according to an embodiment of the present application, storing computer programs that cause a processor to perform any one of the above methods.

In the signal transmission methods and apparatuses, and the storage medium provided in the embodiments of the present application, by determining the first determination mode and/or the second determination mode, where the first determination mode is a mode for determining the first SRS transmission corresponding to the uplink signal, and the second determination mode is a mode for determining the first antenna port corresponding to the uplink signal, and transmitting the first determination mode and/or the second determination mode to the UE, the first determination mode is used for determining the first SRS transmission and/or the second determination mode is used for determining the first antenna port and the uplink signal is transmitted according to the first SRS transmission and/or the first antenna port, the flexibility of configuring and triggering the SRS resource can be improved, the defects of inflexible transmission scheme and low flexibility of configuring and triggering the SRS resource caused by the scheme of only one uplink signal antenna port and/or SRS transmission can be overcame, the network congestion degree is reduced, and the flexibility of signal transmission is improved.

BRIEF DESCRIPTION OF THE DRAWINGS

In order to clearly illustrate the solutions in the embodiments of the present application or in the related art, the drawings used in the descriptions of the embodiments or the related art are briefly described below. It should be noted that the drawings in the following descriptions are some embodiments of the present application.

DETAILED DESCRIPTION

Figure 1:
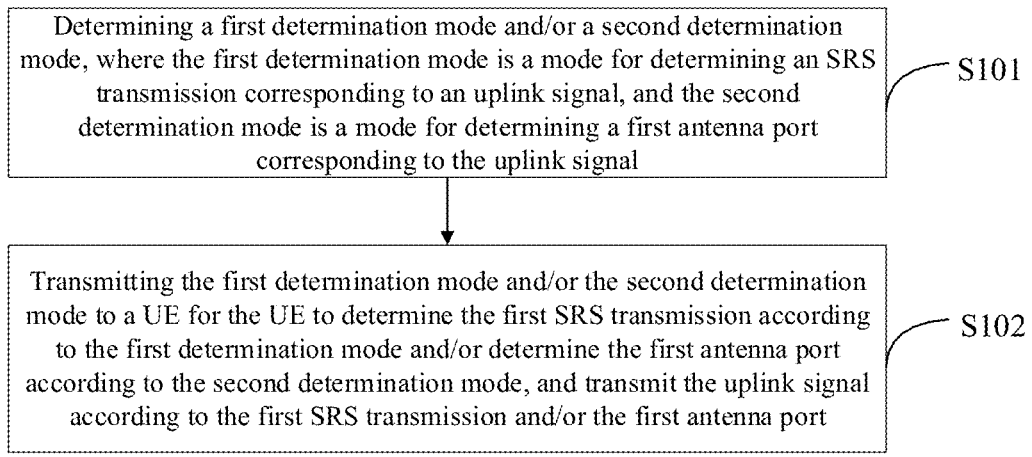
FIG. 1 is a schematic flowchart of a signal transmission method according to an embodiment of the present application.

In the embodiments of the present application, the term "and/or" describes a related relationship of associated objects, and indicates that there can be three kinds of relationships. For example, A and/or B can represent that A exists alone, A and B exist simultaneously, and B exists alone. Character "/" generally indicates that the associated objects have an "or" relationship.

In the embodiments of the present application, the term "multiple" is two or more than two, and other quantifiers are similar.

The solutions according to the embodiments of the present application are clearly and completely described below with reference to the drawings in the embodiments of the present application, and it should be noted that the described embodiments are only some embodiments of the present application, and not all embodiments.

In 3rd generation partnership project (3GPP) new radio (NR) system, a network device can configure one or more SRS resource sets for a user equipment (UE). The configuration information of each SRS resource set includes usage signaling. The usage signaling may be set to "codebook", "non-codebook", "antenna switching", or "beam management". In case that the usage is set to "codebook", the SRS resource set can be used for channel state information (CSI) measurement of codebook based physical uplink shared channel (PUSCH). In case that the usage is set to "non-codebook", the SRS resource set can be used for CSI measurement of non-codebook based PUSCH. In case that the usage is set to "antenna switching", the SRS resource set can be used for downlink CSI measurement. In case that the usage is set to "beam management", the SRS resource set is available for uplink beam management.

In case that a resource type of one SRS resource set is "periodic", the UE periodically transmits the SRS based on the configuration information of the SRS resource set. In case that a resource type of one SRS resource set is "aperiodic", the UE transmits the SRS based on the trigger information of the SRS resource set, for example, the UE transmits the SRS only after receiving a trigger signaling. In case that a resource type of one SRS resource set is "semi-persistent", the UE periodically transmits the SRS based on activation signaling of the SRS resource set until a deactivation signaling is received.

After receiving the SRS transmitted by the UE, the network device can perform PUSCH scheduling, downlink scheduling, uplink beam management, and the like based on the measurement of the SRS.

The codebook based uplink transmission scheme in NR system includes the following procedures.

The UE transmits the SRS used for codebook based uplink transmission scheme to the network device.

The network device performs uplink channel sounding according to the SRS transmitted by the UE, performs resource scheduling on the UE, determines SRS resources corresponding to uplink transmission and the number of uplink transmission layers and a precoding matrix, and further determines a modulation and coding scheme (MCS) level of the uplink transmission according to the precoding matrix and channel information, and then notifies the UE of resource allocation of PUSCH and corresponding MCS, transmit precoding matrix indicator (TPMI), the number of transmission layers and corresponding SRS resource indicator (SRI).

The UE modulates and codes the data according to the MCS indicated by the network device, determines a precoding matrix and the number of transmission layers used when the data is transmitted by using the indicated SRI, TPMI and the number of transmission layers, and then precodes and transmits the data. PUSCH demodulation pilot frequency and PUSCH adopt the same precoding scheme in NR system.

The network device estimates an uplink channel according to the demodulation pilot signal and performs data detection.

The non-codebook based uplink transmission scheme in NR system includes the following operations.

The UE measures downlink reference signal and obtains a candidate uplink precoding matrix, and the UE precodes the SRS used for non-codebook based uplink transmission scheme by using the candidate uplink precoding matrix and then transmits the precoded SRS to the network device.

The network device performs uplink channel sounding according to the SRS transmitted by the UE, performs resource scheduling on the UE, determines SRS signal resources corresponding to uplink transmission and MCS level of uplink transmission, and notifies the UE of these data, where the SRS signal resources corresponding to uplink transmission are indicated to the UE through SRI.

The UE modulates and codes the data according to the MCS level transmitted by the network device, determines the precoding matrix and the number of transmission layers of the data by using the SRI, precodes the data, and then transmits the precoded data. The demodulation pilot frequency for the non-codebook based uplink transmission scheme and PUSCH adopt the same precoding mode.

The network device estimates uplink channel according to the demodulation pilot signal and performs data detection.

It is specified in NR system that the PUSCH uses the same antenna port as an SRS port of an SRS resource indicated by uplink scheduling information, where the SRS port is an SRS port corresponding to the most recent transmission of the SRS resource indicated by the uplink scheduling information, where the SRS resource is prior to a physical downlink control channel (PDCCH) that schedules the PUSCH.

The current protocol only defines one scheme for determining the antenna port corresponding to the PUSCH and determining the SRS corresponding to the PUSCH: the SRS transmission corresponding to the PUSCH is the most recent transmission of the SRS resource indicated by the SRI, where the SRS resource is prior to the PDCCH which schedules the PUSCH. in case that the network device configures the same SRS resource in the SRS resource set with a usage type set to downlink CSI acquisition as the SRS resource set with a usage type set to uplink CSI acquisition, if the SRI in the PUSCH scheduling information indicates the same SRS resource and the UE is scheduled with SRS transmission of the SRS resource set for the downlink CSI acquisition before transmitting the PDCCH which schedules the PUSCH, the UE determines that the SRS transmission corresponding to the PUSCH is the transmission of the SRS resource indicated by the SRI in the transmissions of the SRS resource set for the downlink CSI acquisition. Since the UE does not consider how to ensure the performance of uplink transmission when performing transmissions of the SRS resource set for the downlink CSI acquisition, the performance of uplink transmission may be poor by determining the transmission parameter of PUSCH using the SRS transmission. In order to ensure the performance of uplink transmission, the network device should configure different SRS resources in SRS resource sets of different usage types as much as possible, or must ensure that there is always an SRS resource set with usage type set to CSI acquisition before triggering the PDCCH which schedules the PUSCH and there is always a transmission of this SRS resource set if there is an SRS resource set of another usage type with the same SRS resource as this SRS resource set when it is unavoidable. This may limit flexibility of configuring and triggering an SRS resource, resulting in PDCCH congestion or degrading uplink transmission performance. The triggering position of the non-periodic SRS resource in the traditional system is limited, which easily results in PDCCH congestion and reduces the uplink transmission efficiency.

Embodiments of the present application provide signal transmission methods and apparatuses, and a storage medium, to solve the defects of inflexible transmission scheme and low flexibility of configuring and triggering the SRS resource caused by the scheme of only one uplink signal antenna port and/or SRS transmission, improve the flexibility of configuring and triggering the SRS resource, and then reduce network congestion and improve transmission performance.

The methods and the apparatuses are based on the same concept, the implementation of the apparatuses and the methods can be referred to each other since the principles of the methods and the apparatuses are similar, and the same part is not repeated.

The solutions according to the embodiments of the present application can be applicable to various systems, especially 5G systems. For example, applicable systems can be a global system of mobile communication (GSM) system, a code division multiple access (CDMA) system, a wideband code division multiple access (WCDMA) general packet radio service (GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a UE and a network device. The system can further include a core network part, such as an evolved packet system (EPS), a 5G system (5GS), and the like.

The UE in the embodiments of the present application can be a device that provides voice and/or data connectivity to a user, a handheld device with a wireless connection function, or other processing device connected to a wireless modem. In different systems, the names of the UE may be different. For example, in the 5G system, the UE may be called as user equipment (UE). A wireless UE can communicate with one or more core networks (CN) via a radio access network (RAN), and the wireless UE can be a mobile UE, such as a mobile phone (or cellular phone) and computers with mobile UE, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless UE device may also be called a system, a subscriber unit, a subscriber station, a mobile station, a mobile, a remote station, an access point, a remote UE, an access UE, a user UE, a user agent, and a user device, which are not limited in the embodiments of the present application.

The base station in the embodiments of the present application can be a base station, and the base station can include cells providing services for the UE. Depending on the specific application, the base station may be called an access point, or may be a device in the access network that communicates with wireless UE through one or more sectors on the air interface, or other names. Network device can be used to exchange received air frames with Internet Protocol (IP) packets, and act as a router between wireless UE and the rest of the access network, and the rest of the access network can include an Internet Protocol (IP) communication network. The network devices can also coordinate attribute management for the air interface. For example, the network device in the embodiments of the present application may be a base transceiver station (BTS) in a global system for mobile communications (GSM) or a code division multiple access (CDMA), may be a node B in a wide-band code division multiple access (WCDMA), may be an evolutional node B (eNB or e-Node B) in a long term evolution (LTE) system, a 5G base station (gNB) in 5G network architecture (next generation system), may be a home evolved node B (HeNB), a relay node (relay node), a family base station (femto), a pico base station (pico), etc., which are not limited in the embodiments of the present application. In some network structures, a network device can include a centralized unit (CU) node and a distributed unit (DU) node, and the centralized unit and the distributed unit can be geographically separated.

The following description is given by way of specific examples.

FIG. 1 is a schematic flowchart of a signal transmission method according to an embodiment of the present application, where the signal transmission method is applied to a network device, such as a base station; and as shown in FIG. 1, the signal transmission method can include the following steps.

S101, determining a first determination mode and/or a second determination mode, where the first determination mode is a mode for determining a first sounding reference signal (SRS) transmission corresponding to an uplink signal, and the second determination mode is a mode for determining a first antenna port corresponding to the uplink signal.

For example, the uplink signal may be a physical uplink shared channel (PUSCH), a demodulation reference signal (DMRS), a physical uplink control channel (PUCCH), an SRS, or the like.

In an embodiment, the first antenna port corresponding to the uplink signal is an antenna port corresponding to the uplink signal.

For example, in case that the uplink signal is a PUSCH signal, the first antenna port is a PUSCH port.

For another example, in case that the uplink signal is an SRS, the first antenna port is an SRS port.

In an embodiment, a process of transmitting one SRS can be understood as one SRS transmission.

One SRS resource may be configured in one or more SRS resource sets. Each SRS resource and SRS resource set may be of a certain time domain type, e.g., aperiodic SRS resource, aperiodic SRS resource set, periodic SRS resource, periodic SRS resource set, semi-persistent SRS resource, semi-persistent SRS resource set, etc.

The periodic SRS resource or the periodic SRS resource set is configured through radio resource control (RRC) signaling and is transmitted periodically according to the configured period after being configured. An SRS transmission of one periodic SRS resource set in one period is referred to as one transmission of the SRS resource set, and the SRS transmission for each SRS resource in the SRS resource set is referred to as one SRS transmission. If an SRS resource is configured in a periodic SRS resource set, one transmission of the periodic SRS resource set includes the SRS transmission of the SRS resource.

The semi-persistent SRS resource or the semi-persistent SRS resource set is configured through RRC signaling and is activated through MAC-control element (MAC-CE) signaling or downlink control information (DCI) signaling, and is transmitted periodically according to the configured period after being triggered until receiving a deactivation instruction. An SRS transmission of one semi-persistent SRS resource set in one period is referred to as one transmission of the SRS resource set, and the SRS transmission for each SRS resource in the SRS resource set is referred to as one SRS transmission. If an SRS resource is configured in a semi-persistent SRS resource set, one transmission of the semi-persistent SRS resource set includes the SRS transmission of the SRS resource.

The aperiodic SRS resource or the aperiodic SRS resource set is triggered through DCI signaling and is transmitted only once after being triggered. The transmission of one aperiodic SRS resource set triggered by one trigger signaling is referred to as one transmission of the SRS resource set, and the SRS transmission for each SRS resource in the SRS resource set is referred to as one SRS transmission. If an SRS resource is configured in an aperiodic SRS resource set, one transmission of the aperiodic SRS resource set includes the SRS transmission of the SRS resource.

Figure 3:
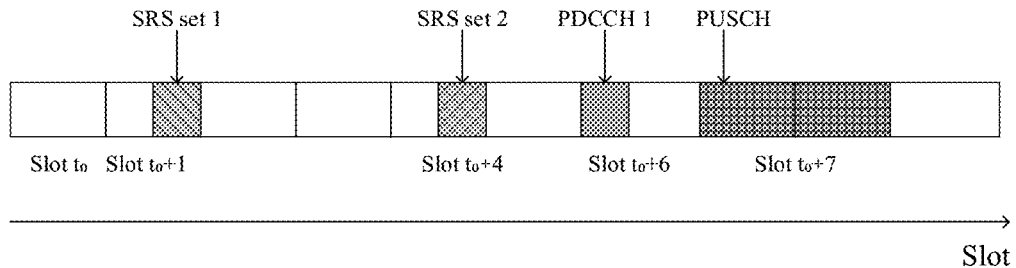
FIG. 3 is a schematic diagram of slots in signal transmission according to an embodiment of the present application.

As shown in FIG. 3, it is assumed that a network device configures an SRS resource set 1 and an SRS resource set 2 for a UE in a bandwidth part (BWP), and the SRS resource set 1 and the SRS resource set 2 are respectively denoted as SRS set 1 and SRS set 2.

The SRS set 1 is assumed to include two SRS resources, namely an SRS resource 1 and an SRS resource 2; and the SRS set 2 is assumed to include two SRS resources, namely the SRS resource 1 and an SRS resource 3. In case that the UE performs SRS transmission for SRS set 1 at slot t0+1 and performs SRS transmission for SRS set 2 at slot t0+4, SRS resource 1 is transmitted once at slot t0+1 and slot t0+4 respectively, SRS resource 2 is transmitted once at slot t0+1, and SRS resource 3 is transmitted once at slot t0+4. The SRS transmission in the slot t0+1 is the SRS transmission of SRS set 1. The SRS transmission in the slot t0+4 is the SRS transmission of SRS set 2.

In an embodiment, the first SRS transmission corresponding to the uplink signal is SRS transmission used for determining filtering of the uplink signal.

For example, in case that the uplink signal is a PUSCH, the first SRS transmission corresponding to the PUSCH can be an SRS transmission indicating a physical antenna and a spatial filtering of the PUSCH of the UE device. The UE transmits the PUSCH using the same spatial filtering and/or physical antenna as the first SRS transmission.

For another example, in case that the uplink signal is an SRS, the first SRS transmission can be an SRS transmission used to determine spatial filtering of the SRS. The UE transmits the SRS using the same spatial filtering and/or physical antenna as spatial filtering and/or physical antenna for the first SRS transmission.

In an embodiment, the first SRS transmission corresponding to the uplink signal is an SRS transmission used by the network device to determine scheduling information for the uplink signal, such as a transmit precoding matrix indicator (TPMI), a transmission rank indicator (TRI), and a MCS level. In an embodiment, the UE determines a precoding matrix of an uplink signal according to the first SRS transmission. For example, in case that the uplink signal is a PUSCH, the first SRS transmission corresponding to the PUSCH can be an SRS transmission of an SRS resource used to determine a precoding matrix of the PUSCH, and the UE transmits the PUSCH using the physical antenna corresponding to this SRS transmission.

In an embodiment, the first SRS transmission corresponding to the uplink signal is an SRS transmission of an SRS resource used to determine an antenna port corresponding to the uplink signal, and the UE determines the antenna port corresponding to the uplink signal according to the antenna port of the SRS resource for the first SRS transmission.

In an embodiment, the antenna port corresponding to the uplink signal is the same as the antenna port of the SRS resource for the first SRS transmission.

For example, in case that the uplink signal is a PUSCH signal, the PUSCH port is the same as the SRS port of the SRS resource for the first SRS transmission.

In an embodiment, in some scenarios, the determination mode for the antenna port corresponding to the uplink signal is independent of the first SRS transmission. For example, the antenna port corresponding to the uplink signal is a predefined antenna port, such as an antenna port of one SRS resource in an SRS resource set with a certain usage type configured by a network device. For another example, the determination mode of the antenna port corresponding to the uplink signal is independent of SRS transmission, and the antenna port corresponding to the uplink signal is determined according to antenna port indication information indicated by the network device, where the antenna port indication information directly indicates that which reference signal is the same as the antenna port corresponding to the uplink signal.

S102, transmitting the first determination mode and/or the second determination mode to a user equipment (UE), the first determination mode is used for determining the first SRS transmission and/or the second determination mode is used for determining the first antenna port and the uplink signal is transmitted according to the first SRS transmission and/or the first antenna port.

For example, after the network device configures the first determination mode and/or the second determination mode for the UE, the UE can determine the first SRS transmission corresponding to the uplink signal according to the first determination mode and/or determine the first antenna port corresponding to the uplink signal according to the second determination mode.

As can be seen from the foregoing embodiment, the first determination mode and/or the second determination mode are/is determined by the network device, where the first determination mode is a mode for determining the first SRS transmission corresponding to the uplink signal and the second determination mode is a mode for determining the first antenna port corresponding to the uplink signal; and the first determination mode and/or the second determination mode is transmitted to the UE, the first determination mode is used for determining the first SRS transmission and/or the second determination mode is used for determining the first antenna port and the uplink signal is transmitted according to the first SRS transmission and/or the first antenna port, the defects of inflexible transmission scheme and low flexibility of SRS resource configuration and triggering caused by the scheme of only one uplink signal antenna port and/or SRS transmission are addressed, the network congestion degree is reduced, and the flexibility of signal transmission is improved.

In an embodiment, the first SRS transmission corresponding to the uplink signal in S101 can be one or more SRS transmissions of a given SRS resources; where the given SRS resources are the SRS resources indicated by SRS resource indication information in the scheduling information for the uplink signal. An implementation of the SRS resource indication information is indicated by an SRS resource indicator (SRI).

In an embodiment, when performing the S101, the method can include:
S1011, determining the first determination mode, where the first determination mode can be determined by the following schemes:
scheme 1 for S1011, determining the first SRS transmission according to one or more SRS transmissions of a first SRS resource set and/or one or more SRS transmissions of a second SRS resource set;
scheme 2 for S1011, determining a second SRS transmission, taking the second SRS transmission as the first SRS transmission; and
scheme 3 for S1011, determining one or more SRS transmissions of a third SRS resource set as the first SRS transmission.

In an embodiment, the first SRS resource set is an SRS resource set with a given type that unmatched with the transmission mode of the uplink signal;
the second SRS resource set is an SRS resource set matched with the transmission mode of the uplink signal;
the second SRS transmission is the most recent SRS transmission of the SRS resource indicated by SRS resource indicator (SRI) in downlink control information (DCI), where the SRS resource is prior to the physical downlink control channel (PDCCH) carrying the DCI which schedules the uplink signal; and
the third SRS resource set is the SRS resource set indicated by the SRS resource set indicator transmitted by the network device.

In an embodiment, the scheme 1 for S1011 can include one or more of the followings:
determining the first SRS transmission from the one or more transmission of the first SRS resource set in case that the network device configures the first SRS resource set and the second SRS resource set for the UE simultaneously;
determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources;
determining a third SRS transmission and taking the third SRS transmission as the first SRS transmission; or
determining a fourth SRS transmission and taking the fourth SRS transmission as the first SRS transmission;
where the third SRS transmission is an SRS transmission of SRS resource indicated by SRI in DCI which schedules the uplink signal in the most recent transmission of the second SRS resource set, where the SRS resource is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, the given type is a given usage type. For example, the given type is a usage for CSI acquisition of codebook PUSCH, for example, usage signaling is set to "codebook" in NR system. As another example, the given type is a usage for CSI acquisition of non-codebook PUSCH, for example, usage signaling is set to "non-codebook" in NR system. As another example, the given type is a usage for antenna switching or downlink CSI acquisition, for example, usage signaling is set to "antennaSwitching" in NR system. As another example, the given type is a usage for beam management, for example, usage signaling is set to "beamManagement" in NR system.

In an embodiment, the transmission mode of the uplink signal is a codebook based transmission scheme, and the SRS resource set unmatched with the transmission mode of the uplink signal is an SRS resource set with usage not set to "codebook". In case that the usage of one SRS resource set is set to "codebook", the SRS resource set is an SRS resource set matched with the transmission mode of the uplink signal.

In an embodiment, the SRS resource set unmatched with the transmission mode of the uplink signal is an SRS resource set with usage set to "antennaSwitching".

In an embodiment, the SRS resource set unmatched with the transmission mode of the uplink signal is an SRS resource set with usage not set to a value corresponding to uplink CSI measurement.

In an embodiment, the SRS resource set unmatched with the transmission mode of the uplink signal is an SRS resource set with a usage signaling being set to "antennaSwitching", or "non-codebook" or "beamManagement" or "positioning".

In an embodiment, the transmission mode of the uplink signal is a non-codebook based transmission scheme, and the SRS resource set unmatched with the transmission mode of the uplink signal is an SRS resource set with usage not set to "non-codebook". In case that the usage of one SRS resource set is set to "non-codebook", the SRS resource set is an SRS resource set matched with the transmission mode of the uplink signal.

In an embodiment, the SRS resource set unmatched with the transmission mode of the uplink signal is an SRS resource set with usage set to "antennaSwitching".

In an embodiment, the SRS resource set unmatched with the transmission mode of the uplink signal is an SRS resource set with usage not set to a value corresponding to the transmission mode of the uplink signal.

In an embodiment, the SRS resource set unmatched with the transmission mode of the uplink signal is an SRS resource set with usage set to "antennaSwitching", or "codebook", or "beamManagement", or "positioning".

In an embodiment, the transmission mode of the uplink signal is a codebook based transmission scheme, and the SRS resource set unmatched with the transmission mode of the uplink signal is an SRS resource set with usage not set to "codebook". For example, in case that the usage signaling of one SRS resource set is set to "codebook/antennaSwitching" or "codebook & antennaSwitching", the SRS resource set is an SRS resource set matched with the transmission mode of the uplink signal.

In an embodiment, the transmission mode of the uplink signal is a non-codebook based transmission scheme, and the SRS resource set unmatched with the transmission mode of the uplink signal is an SRS resource set with usage not set to "non-codebook". For example, in case that the usage signaling of one SRS resource set is set to "non-codebook/antennaSwitching" or "non-codebook & antennaSwitching, the SRS resource set is an SRS resource set matched with the transmission mode of the uplink signal.

In an embodiment, one or more SRS resources are simultaneously configured in the SRS resource set unmatched with the transmission mode of the uplink signal and the SRS resource set matched with the transmission mode of the uplink signal, where the SRS transmission corresponding to the SRS resource set unmatched with the transmission mode of the uplink signal is: an SRS transmission of the one or more same SRS resources in the SRS transmissions of the SRS resource set unmatched with the transmission mode of the uplink signal.

As can be seen from the foregoing embodiments, by determining the first determination mode of the first SRS transmission corresponding to the uplink signal, the flexibility of configuring and triggering the SRS resource can be improved, and the transmission performance can be improved.

In an embodiment, when the scheme 1 for S1011 is determined, one or more of the followings can be included.

(1) The first SRS transmission corresponding to the uplink signal is determined according to one or more SRS transmissions of the SRS resource set with a given type that unmatched with the transmission mode of the uplink signal.

For example, the one or more SRS transmissions of the SRS resource set with a given type that unmatched with the transmission mode of the uplink signal can be determined as the first SRS transmission corresponding to the uplink signal.

(2) The first SRS transmission corresponding to the uplink signal is determined according to one or more SRS transmissions of the SRS resource set matched with the transmission mode of the uplink signal.

For example, the one or more SRS transmissions of the SRS resource set matched with the transmission mode of the uplink signal can be determined as the first SRS transmission corresponding to the uplink signal.

(3) The first SRS transmission corresponding to the uplink signal is determined according to one or more SRS transmissions of the SRS resource set with a given type that unmatched with the transmission mode of the uplink signal and one or more SRS transmissions of the SRS resource set matched with the transmission mode of the uplink signal.

In an embodiment, the given type can include one or more of the followings:
  usage is for CSI acquisition of codebook PUSCH, for example, usage is set to "codebook" in NR system;
  usage is for CSI acquisition of non-codebook PUSCH, for example, usage is set to "non-codebook" in NR system;
  usage is for antenna switching or downlink CSI acquisition; or
  usage is for beam management, for example, usage is set to "beamManagement" in NR system.

As can be seen from the foregoing embodiments, the first determination mode determined by the network device includes the foregoing multiple manners, which can overcome the defect of low flexibility of configuring and triggering the SRS resource in the related art, and achieve the effects of reducing congestion and improving transmission performance.

In an embodiment, when S101 is performed, the method can include:
  S1012, determining the second determination mode; where the second determination mode can include one or more of the followings:
  a scheme 1 for S1012: determining the first antenna port according to an antenna port for one or more SRS transmissions of a fourth SRS resource set and/or an antenna port for one or more SRS transmissions of a fifth SRS resource set;
  a scheme 2 for S1012: determining an antenna port for fifth SRS transmission, and taking the antenna port for the fifth SRS transmission as the first antenna port; or
  a scheme 3 for S1012: determining an antenna port for one or more SRS transmissions of a sixth SRS resource set as the first antenna port.

In an embodiment, the fourth SRS resource set is an SRS resource set with a given type that unmatched with the transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is the SRS resource set indicated by SRS resource set indication information transmitted by the network device.

In an embodiment, the scheme 1 for S1012 can include one or more of the followings:

determining the first antenna port from the antenna port for one or more SRS transmissions of the fourth SRS resource set in case that the network device configures the fourth SRS resource set and the fifth SRS resource set for the UE simultaneously;

determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources;

determining an antenna port for sixth SRS transmission, and taking the antenna port for the sixth SRS transmission as the first antenna port; or determining an antenna port for seventh SRS transmission, and taking the antenna port for the seventh SRS transmission as the first antenna port.

In an embodiment, the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, the given type is a given usage type. For example, the given type is a usage for CSI acquisition of codebook PUSCH, for example, usage is set to "codebook" in NR system. As another example, the given type is a usage for CSI acquisition of non-codebook PUSCH, for example, usage is set to "non-codebook" in NR system. As another example, the given type is a usage for antenna switching or downlink CSI acquisition, for example, usage is set to "antennaSwitching" in NR system. As another example, the given type is a usage for beam management, for example, usage is set to "beamManagement" in NR system.

In an embodiment, the transmission mode of the uplink signal is a codebook based transmission scheme, and the SRS resource set unmatched with the transmission mode of the uplink signal is an SRS resource set with usage not set to "codebook". In case that the usage of one SRS resource set is set to "codebook", the SRS resource set is an SRS resource set matched with the transmission mode of the uplink signal.

In an embodiment, the SRS resource set unmatched with the transmission mode of the uplink signal is an SRS resource set with usage set to "antennaSwitching". In this embodiment, the second determination mode can indicate that one or more SRS transmissions of the SRS resource set with usage set to "antennaSwitching" can be used to determine information of the first antenna port corresponding to the uplink signal.

In an embodiment, the SRS resource set unmatched with the transmission mode of the uplink signal is an SRS resource set with usage not set to a value corresponding to uplink CSI measurement. In this embodiment, the second determination mode can indicate that one or more SRS transmissions of the SRS resource set with usage not set to "codebook" and "non-codebook" can be used to determine information of the first antenna port corresponding to the uplink signal.

In an embodiment, the SRS resource set unmatched with the transmission mode of the uplink signal is an SRS resource set with usage set to "antennaSwitching", or "non-codebook", or "beamManagement", or "positioning".

In an embodiment, the transmission mode of the uplink signal is a non-codebook based transmission scheme, and the SRS resource set unmatched with the transmission mode of the uplink signal is an SRS resource set with usage not set to "non-codebook". In case that the usage signaling of one SRS resource set is set to "non-codebook", the SRS resource set is an SRS resource set matched with the transmission mode of the uplink signal.

In an embodiment, the SRS resource set unmatched with the transmission mode of the uplink signal is an SRS resource set with usage set to "antennaSwitching".

In an embodiment, the SRS resource set unmatched with the transmission mode of the uplink signal is an SRS resource set with usage not set to a value corresponding to the transmission mode of the uplink signal.

In an embodiment, the SRS resource set unmatched with the transmission mode of the uplink signal is an SRS resource set with usage set to "antennaSwitching", or "codebook", or "beamManagement", or "positioning".

In an embodiment, the transmission mode of the uplink signal is a codebook based transmission scheme, and the SRS resource set unmatched with the transmission mode of the uplink signal is an SRS resource set with usage not set to codebook. For example, in case that the usage signaling of one SRS resource set is set to "codebook/antennaSwitching" or "codebook & antennaSwitching, the SRS resource set is an SRS resource set matched with the transmission mode of the uplink signal.

In an embodiment, the transmission mode of the uplink signal is a non-codebook based transmission scheme, and the SRS resource set unmatched with the transmission mode of the uplink signal is an SRS resource set with usage not set to non-codebook. For example, in case that the usage signaling of one SRS resource set is set to "non-codebook/antennaSwitching" or "non-codebook & antennaSwitching, the SRS resource set is an SRS resource set matched with the transmission mode of the uplink signal.

In an embodiment, one or more same SRS resources are configured in the SRS resource set unmatched with the transmission mode of the uplink signal and the SRS resource set matched with the transmission mode of the uplink signal simultaneously, where SRS transmission corresponding to the SRS resource set unmatched with the transmission mode of the uplink signal is: an SRS transmission of the one or more same SRS resources in the SRS transmissions of the SRS resource set unmatched with the transmission mode of the uplink signal.

As can be seen from the foregoing embodiments, by determining the second determination mode by the network device, the defect of low flexibility of configuring and triggering the SRS resource can be overcome, and the effects of reducing congestion and improving transmission performance are achieved.

In an embodiment, when the scheme 1 for S1012 is determined, one or more of the followings can be included.
(1) The first antenna port corresponding to the uplink signal is determined according to the antenna port for one or more SRS transmissions of the SRS resource set with a given type that unmatched with the transmission mode of the uplink signal.

For example, the antenna port for one or more SRS transmissions of the SRS resource set with a given type that unmatched with the transmission mode of the uplink signal can be determined as the first antenna port corresponding to the uplink signal.
(2) The first antenna port corresponding to the uplink signal is determined according to antenna port for one or more SRS transmissions of the SRS resource set matched with the transmission mode of the uplink signal.

For example, the antenna port for one or more SRS transmissions of the SRS resource set matched with the transmission mode of the uplink signal is determined as the first antenna port corresponding to the uplink signal.
(3) The first antenna port corresponding to the uplink signal is determined according to antenna port for one or more SRS transmissions of the SRS resource set with a given type that unmatched with the transmission mode of the uplink signal and the antenna port for one or more SRS transmissions of the SRS resource set matched with the transmission mode of the uplink signal.

In an embodiment, the given type can include one or more of the followings:
usage is for CSI acquisition of codebook PUSCH, for example, usage is set to "codebook" in NR system;
usage is for CSI acquisition of non-codebook PUSCH, for example, usage is set to "non-codebook" in NR system;
usage is for antenna switching or downlink CSI acquisition; or usage is for beam management, for example, usage is set to "beamManagement" in NR system.

Figure 2:
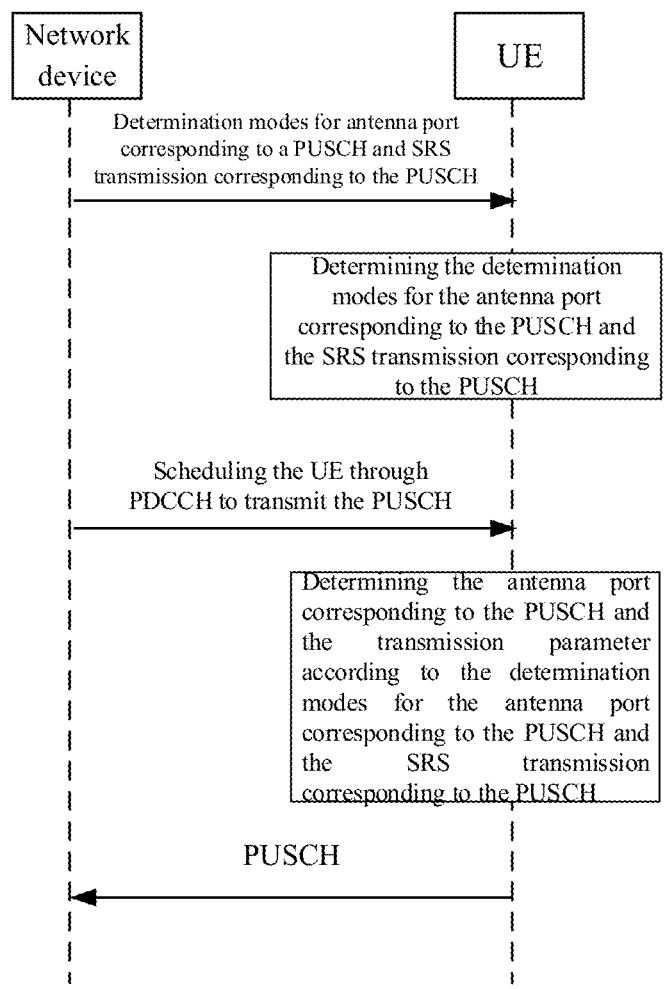
FIG. 2 is a schematic diagram of signal transmission according to an embodiment of the present application.

For example, as shown in FIG. 2, the network device transmits a first indication signaling to the UE, where the first indication signaling indicates determination modes for antenna port corresponding to a PUSCH and SRS transmission corresponding to the PUSCH;
the UE determines the determination modes for the antenna port corresponding to the PUSCH and the SRS transmission corresponding to the PUSCH according to the first indication signaling transmitted by the network device to the UE;
the network device schedules the UE through PDCCH to transmit the PUSCH; and
the UE determines the antenna port corresponding to the PUSCH and the corresponding SRS transmission according to the determination modes for the antenna port corresponding to the PUSCH and the SRS transmission corresponding to the PUSCH, and transmits the PUSCH using the determined antenna port.

For example, in this embodiment, the first indication signaling indicates the determination modes for the antenna port corresponding to the PUSCH and the SRS includes: an SRS resource set with usage set to "antennaSwitching" can be used to determine the antenna port corresponding to the PUSCH, the SRS corresponding to the PUSCH is the most recent SRS transmission of an SRS resource indicated by an SRS resource indicator (SRI) in downlink control information (DCI) which schedules the PUSCH, where the SRS resource is prior to the PDCCH which schedules the uplink signal, and the antenna port corresponding to the PUSCH is the same as the antenna port for the SRS transmission. The UE determines that the SRS corresponding to the PUSCH is the most recent SRS transmission of the SRS resource indicated by the SRI in the DCI which schedules the uplink signal, where the SRS resource is prior to the PDCCH which schedules the PUSCH, determines the antenna port corresponding to the PUSCH according to the SRS transmission, and then transmits the PUSCH.

As shown in FIG. 3, it is assumed that the network device configures an SRS resource set 1 and an SRS resource set 2 for the UE in one BWP, and the network device indicates to the UE that the transmission scheme of the PUSCH is a codebook based PUSCH transmission. In an example, SRS resource set 1 and SRS resource set 2 are denoted as SRS set 1 and SRS set 2 respectively.

It is assumed that the usage of the SRS set 1 is set to codebook and the SRS set 1 includes two SRS resources which are SRS resource 1 and SRS resource 2; and the usage of the SRS set 2 is set to antennaSwitching, and the SRS set 2 includes two SRS resources which are SRS resource 1 and SRS resource 3. It is assumed that the UE performs SRS transmission of the SRS set 1 at slot t0+1 and performs SRS transmission of the SRS set 2 at slot t0+4. The network device transmits PDCCH 1 to the UE at slot t0+6, and PDCCH 1 schedules the UE to transmit PUSCH at slot t0+7. In case that the DCI of the PDCCH 1 includes SRI, and the SRI indicates SRS resource 1 in SRS set 2, the UE determines that the first SRS transmission is the SRS transmission of SRS resource 1 in the SRS transmissions of SRS set 2 at slot t0+4 and the PUSCH transmitted at slot t0+7 is transmitted using the same antenna port as the SRS port of SRS resource 1 at slot t0+4. When performing PUSCH transmission, the UE performs filtering using the same transmission filtering as SRS transmission of SRS resource 1 at slot t0+4.

Theses embodiments can be extended to the case where the PUSCH is a non-codebook PUSCH, which are not further described.

For another example, the first indication signaling indicates the determination modes for the antenna port corresponding to the PUSCH and the SRS includes: only the SRS resource set with a usage signaling being set to "codebook" can be used to determine the antenna port corresponding to the PUSCH, the SRS corresponding to the PUSCH is the most recent SRS transmission of the SRS resource indicated by the SRI in the DCI which schedules the PUSCH, where the SRS resource is prior to the PDCCH that schedules the uplink signal, and the antenna port corresponding to the PUSCH is the same as the antenna port for the SRS transmission. The UE determines that the SRS corresponding to the PUSCH is the most recent SRS transmission of the SR resource indicated by the SRI in the DCI which schedules the uplink signal, where the SRS resource is prior to the PDCCH which schedules the PUSCH, determines the antenna port corresponding to the PUSCH according to the SRS transmission, and then transmits the PUSCH.

As shown in FIG. 3, it is assumed that the network device configures an SRS resource set 1 and an SRS resource set 2 for the UE in one BWP, and the network device indicates the UE that the transmission scheme of the PUSCH is a codebook based PUSCH transmission. In an example, SRS resource set 1 and SRS resource set 2 are denoted as SRS set 1 and SRS set 2 respectively.

It is assumed that the usage parameter of the SRS set 1 is set to codebook and the SRS set 1 includes two SRS resources which are SRS resource 1 and SRS resource 2; and the usage parameter of the SRS set 2 is set to antennaSwitching and the SRS set 2 includes two SRS resources which are SRS resource 1 and SRS resource 3. It is assumed that the UE performs SRS transmission of SRS set 1 at slot t0+1 and performs SRS transmission of SRS set 2 at slot t0+4. The network device transmits PDCCH 1 to the UE at slot t0+6, and PDCCH 1 schedules the UE to transmit PUSCH at slot t0+7. In case that the DCI of the PDCCH 1 includes SRI and the SRI indicates SRS resource 1, the UE determines that the first SRS transmission is the SRS transmission of the SRS resource 1 in SRS transmissions of the SRS set 1 at slot t0+1 and the PUSCH transmitted at slot t0+7 is transmitted using the same antenna port as the SRS port of SRS transmission of SRS resource 1 at slot t0+1. When performing PUSCH transmission, the UE performs filtering using the same transmission filtering as SRS transmission of SRS resource 1 at slot t0+1.

These embodiments can be extended to the case where the PUSCH is a non-codebook PUSCH, which are not further described.

Figure 4:
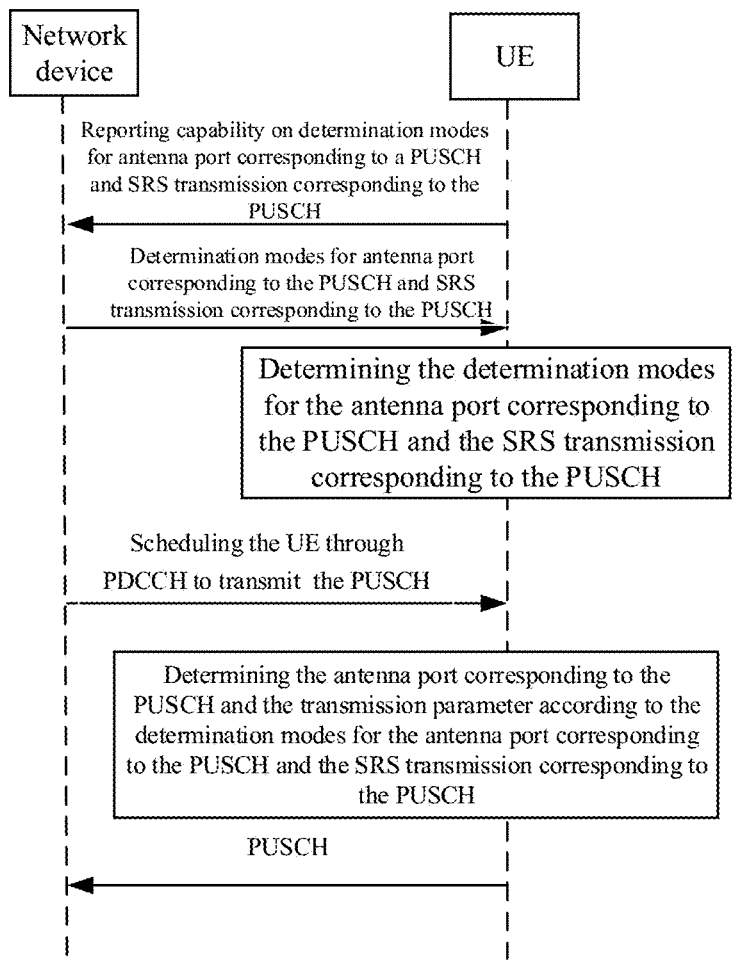
FIG. 4 is a schematic diagram of signal transmission according to an embodiment of the present application.

For another example, as shown in FIG. 4, before the network device transmits the determination modes for the antenna port corresponding to the PUSCH and the SRS transmission corresponding to the PUSCH to the UE, the UE transmits the determination modes supported by the UE for the antenna port corresponding to the PUSCH and the SRS transmission corresponding to the PUSCH to the network device. The network device determines the indication information of the determination modes for the antenna port corresponding to the PUSCH and the SRS transmission corresponding to the PUSCH according to the UE capability.

As can be seen from the above embodiments, by determining the first determination mode and/or the second determination mode, where the first determination mode is a mode for determining the first SRS transmission corresponding to the uplink signal and the second determination mode is a mode for determining the first antenna port corresponding to the uplink signal, and transmitting the first determination mode and/or the second determination mode to the UE, the first determination mode is used for determining the first SRS transmission and/or the second determination mode is used for determining the first antenna port and the uplink signal is transmitted according to the first SRS transmission and/or the first antenna port, the defect of low flexibility of configuring and triggering the SRS resource can be overcame, and the effects of reducing congestion and improving transmission performance can be reached.

In an embodiment, the transmission mode of the uplink signal in S1011 or S1012 can include: a codebook based transmission scheme and/or a non-codebook based transmission scheme.

For example, the transmission mode of the uplink signal in S1011 or S1012 includes, but is not limited to, the following three types:
 type 1: a codebook based transmission scheme;
 type 2: a non-codebook based transmission scheme; and
 type 3: a codebook based transmission scheme and a non-codebook based transmission scheme;
 where the SRS resource set matched with the codebook based transmission scheme in the type 1 is an SRS resource set with usage set to codebook;
 the SRS resource set matched with the non-codebook based transmission scheme in the type 2 is an SRS resource set with usage set to non-codebook.

Figure 5:
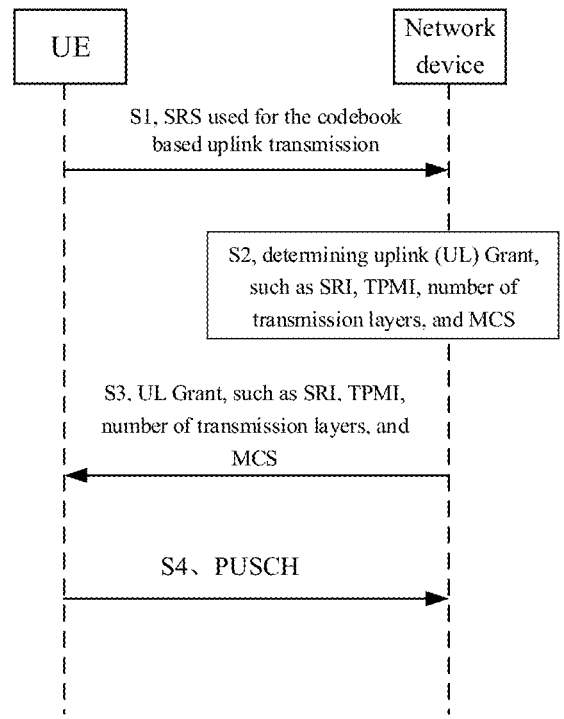
FIG. 5 is a schematic diagram of a codebook based uplink transmission scheme according to an embodiment of the present application.

For example, as shown in the schematic diagram of the codebook based uplink transmission scheme in FIG. 5, the flow of the codebook based uplink transmission scheme in NR system includes:
 S1, the UE transmits SRS used for the codebook based uplink transmission scheme to the network device;
 the network device performs uplink channel sounding according to the SRS transmitted by the UE, performs resource scheduling on the UE, determines an SRS resource corresponding to uplink transmission, a number of uplink transmission layers and a precoding matrix, and further determines an MCS level of the uplink transmission according to the precoding matrix and channel information;
 S2, the network device notifies the UE of PUSCH resource allocation and the corresponding MCS, transmit precoding matrix indicator (TPMI), number of transmission layers and corresponding SRS resource indicator (SRI);
 S3, the UE modulates and codes the data according to the MCS indicated by the network device, and determines the used precoding matrix and the number of transmission layers when transmitting the data by using the indicated SRI, TPMI and the number of transmission layers, to precode and transmit the data; and
 S4, the PUSCH demodulation pilot frequency in NR system and the PUSCH adopt the same precoding mode.

Figure 6:
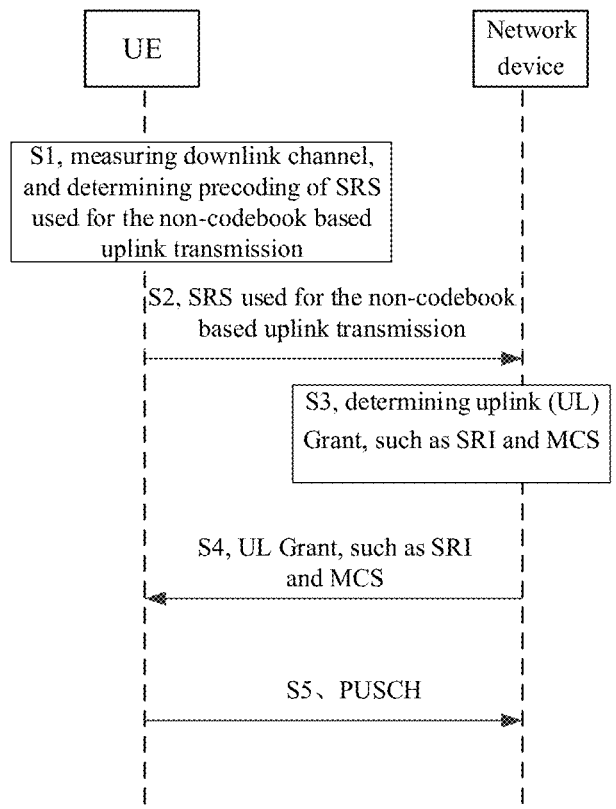
FIG. 6 is a schematic diagram of a non-codebook based uplink transmission scheme according to an embodiment of the present application.

For another example, as shown in the schematic diagram of non-codebook based uplink transmission scheme in FIG. 6, the non-codebook based uplink transmission in NR system includes the following transmission flows:
 S1, the UE measures a downlink reference signal and obtains a candidate uplink precoding matrix, and precodes SRS used for the non-codebook based uplink transmission scheme by using the candidate uplink precoding matrix;
 S2, the UE transmits the precoded SRS used for the non-codebook based uplink transmission scheme to the network device;
 S3, the network device performs uplink channel sounding according to the SRS transmitted by the UE, performs resource scheduling on the UE and determines SRS signal resource corresponding to uplink transmission, MCS level of the uplink transmission and the like;
 S4, the network device notifies the UE of the SRS signal resource corresponding to the uplink transmission and the MCS level of the uplink transmission, where the SRS signal resource corresponding to the uplink transmission is indicated to the UE through SRI; and
 S5, the UE modulates and codes the data according to the MCS transmitted by the network device, determines the precoding and the number of transmission layers of the data according to the SRI, and transmits the data after precoding the data. The demodulation pilot frequency for the non-codebook based uplink transmission scheme and the data of PUSCH adopt the same precoding mode.

As can be seen from the above embodiments, the transmission mode of the uplink signal includes the codebook based transmission scheme and/or the non-codebook based transmission scheme, where the SRS resource set matched with the codebook based transmission scheme is an SRS resource set with usage set to codebook, and the SRS resource set matched with the non-codebook based transmission scheme is an SRS resource set with usage set to non-codebook, which can overcome the defect of low flexibility of configuring and triggering the SRS resource in the related art, and the effects of reducing congestion and improving transmission performance are achieved.

In an embodiment, in S102, when transmitting the first determination mode and/or the second determination mode to the UE, the method can include:

S1021, transmitting the first determination mode and/or the second determination mode to the UE through a first indication signaling;

where the signal transmission scheme determined by the network device can further include:

the network device determines first information used for indicating an SRS resource set in scheduling information for the uplink signal;

S1022, transmitting the first information to the UE through the first indication signaling or second indication signaling, where the second indication signaling is different from the first indication signaling.

In an embodiment, the following two schemes are included:

scheme 1: the network device transmits the first information of the SRS resource set in the scheduling information for the uplink signal to the UE through the first indication signaling;

scheme 2: the network device transmits the first information of the SRS resource set in the scheduling information for the uplink signal to the UE through the second indication signaling;

where the second indication signaling is different from the first indication signaling in the two schemes.

In an embodiment, the first indication signaling includes:

the first information of the SRS resource set in the scheduling information for the uplink signal.

In an embodiment, the first SRS transmission corresponding to the uplink signal can include:

one or more SRS transmissions of the SRS resource set indicated by the first information of the SRS resource set in the scheduling information for the uplink signal; or the first antenna port corresponding to the uplink signal is an antenna port of one or more SRS transmissions of the SRS resource set indicated by the first information of the SRS resource set in the scheduling information for the uplink signal; or one or more SRS transmissions of the SRS resource set indicated by the first information of the SRS resource set in the scheduling information for the uplink signal and the first antenna port corresponding to the uplink signal is the antenna port for the one or more SRS transmissions of the SRS resource set indicated by the first information of the SRS resource set in the scheduling information for the uplink signal.

As can be seen from the foregoing embodiments, the transmitting the first determination mode and/or the second determination mode to the UE includes:

transmitting the first determination mode and/or the second determination mode to the UE through the first indication signaling; the signal transmission method further includes: determining first information for indicating SRS resource set; transmitting the first information to the UE through the first indication signaling or second indication signaling, where the second indication signaling is different from the first indication signaling, which can overcome the defect of low flexibility of configuring and triggering the SRS resource in the related art, and the effects of reducing congestion and improving transmission performance are achieved.

In an embodiment, when transmitting the first determination mode and/or the second determination mode to the UE in S102, a third indication information is transmitted to the UE, where the third indication information is used for indicating a bit width of SRI information;

where the SRI is used to indicate SRS resource for the first SRS transmission and/or SRS resource mapped to the first antenna port.

For example, when transmitting the first determination mode and/or the second determination mode determined by the network device to the UE in S102, the method can further include:

the network device transmits the third indication information to the UE, where the third indication information transmitted by the network device to the UE is used for indicating the bit width of the SRI information;

where the SRI indicated by the third indication information is used to indicate the followings:

an SRS resource for the first SRS transmission; or an SRS resource mapped to the first antenna port corresponding to the uplink signal; or the SRS resource for the first SRS transmission and the SRS resource mapped to the first antenna port corresponding to the uplink signal.

In an embodiment, the bit width of the SRI information is determined by the network device according to the number of SRS resources included in a seventh SRS resource set;

where the seventh SRS resource set includes all SRS resource sets for determining the first SRS transmission.

For example, the bit width of the SRI information is determined by the network device according to the number of SRS resources included by all SRS resource sets for determining the first SRS transmission.

It can be seen from the above embodiments, the network device transmits the third indication information to the UE, where the third indication information is used to indicate the bit width of the SRI information; the SRI is used to indicate SRS resource for the first SRS transmission and/or the SRS resource mapped to the first antenna port, which can overcome the defect of low flexibility of configuring and triggering the SRS resource in the related art, and achieve the effects of reducing congestion and improving transmission performance.

In an embodiment, before performing S101 and S102, the method can further include:

the network device receives UE capability information transmitted by the UE; and the network device determines the first determination mode and/or the second determination mode according to the UE capability information.

As can be seen from the foregoing embodiments, the network device determines the first determination mode and/or the second determination mode, where the first determination mode is a mode for determining first SRS transmission corresponding to the uplink signal and the second determination mode is a mode for determining the first antenna port corresponding to the uplink signal, and transmits the first determination mode and/or the second determination mode to the UE for the UE to determine first SRS transmission corresponding to the uplink signal and/or determine the first antenna port corresponding to the uplink signal according to the first determination mode and/or the second determination mode, and transmit the uplink signal according to the first SRS transmission corresponding to the uplink signal and/or the first antenna port corresponding to the uplink signal. In the present application, by improving the flexibility of configuring and triggering the SRS resource, congestion can be reduced and the transmission performance can be improved.

Figure 7:
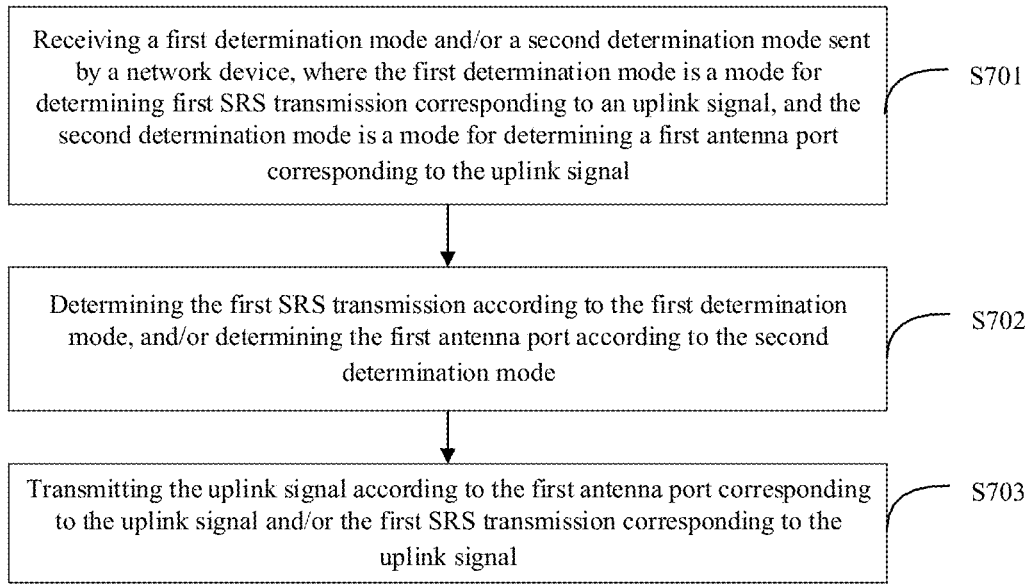
FIG. 7 is a schematic flowchart of a signal transmission method according to an embodiment of the present application.

FIG. 7 shows a signal transmission method according to an embodiment of the present application, where the signal transmission method is applied to a UE; and as shown in FIG. 7, the signal transmission method can include the following steps.

S701, receiving a first determination mode and/or a second determination mode transmitted by a network device, where the first determination mode is a mode for determining first sounding reference signal (SRS) transmission corresponding to an uplink signal, and the second determination mode is a mode for determining a first antenna port corresponding to the uplink signal.

For example, the receiving, by the UE, the first determination mode and/or the second determination mode transmitted by the network device includes: receiving, by the UE, the first determination mode and/or the second determination mode transmitted by the network device through radio resource control (RRC) signaling, MAC-control element (MAC-CE) signaling, downlink control information (DCI) signaling, and the like.

S702, determining the first SRS transmission according to the first determination mode, and/or determining the first antenna port according to the second determination mode.

For example, the UE determines, according to the first determination mode and/or the second determination mode transmitted by the network device, the first antenna port corresponding to the uplink signal, or the first SRS transmission corresponding to the uplink signal, or the first antenna port corresponding to the uplink signal and the first SRS transmission corresponding to the uplink signal.

In an embodiment, the uplink signal may be a physical uplink shared channel (PUSCH), a demodulation reference signal (DMRS), a physical uplink control channel (PUCCH), an SRS, or the like.

In an embodiment, the first antenna port corresponding to the uplink signal is an antenna port corresponding to the uplink signal. For example, in case that the uplink signal is a PUSCH signal, the first antenna port is a PUSCH port. For another example, in case that the uplink signal is an SRS, the first antenna port is an SRS port.

In an embodiment, the first SRS transmission corresponding to the uplink signal is SRS transmission used for determining filtering of the uplink signal. Still taking the uplink signal is PUSCH as an example, the first SRS transmission corresponding to the PUSCH can be an SRS transmission for the network device to determine scheduling information for the PUSCH. The UE transmits the PUSCH using the same spatial filtering and/or physical antenna as spatial filtering and/or physical antenna for the first SRS transmission.

Taking the uplink signal is SRS as an example, the first SRS transmission can be an SRS transmission used to determine spatial filtering of the SRS. The UE transmits the SRS using the same spatial filtering and/or physical antenna as spatial filtering and/or physical antenna for the first SRS transmission.

In an embodiment, the first SRS transmission corresponding to the uplink signal is an SRS transmission for determining SRS resource of the antenna port corresponding to the uplink signal. The UE determines the antenna port corresponding to the uplink signal according to the antenna port of the SRS resource for the first SRS transmission. In an embodiment, the antenna port corresponding to the uplink signal is the same as the antenna port of the SRS resource for the first SRS transmission. Taking the uplink signal is a PUSCH signal as an example, the PUSCH port is the same as the SRS port of the SRS resource for the first SRS transmission.

S703, transmitting the uplink signal according to the first antenna port corresponding to the uplink signal and/or the first SRS transmission corresponding to the uplink signal.

For example, the UE transmits the uplink signal according to the first antenna port corresponding to the uplink signal, or the first SRS transmission corresponding to the uplink signal, or the first antenna port corresponding to the uplink signal and the first SRS transmission corresponding to the uplink signal.

In an embodiment, the UE transmits the uplink signal according to the first antenna port corresponding to the uplink signal, including: the UE transmits the uplink signal using the first antenna port. Taking the uplink signal is a PUSCH signal as an example, the UE transmits the PUSCH signal using the first antenna port as the antenna port corresponding to the PUSCH signal.

In an embodiment, the UE transmits the uplink signal according to the first SRS transmission corresponding to the uplink signal, which includes: when the UE transmits the uplink signal, the UE performs spatial filtering on the uplink signal using spatial filtering used during the first SRS transmission corresponding to the uplink signal.

In an embodiment, the UE transmits the uplink signal according to the first SRS transmission corresponding to the uplink signal, which includes: when the UE transmits the uplink signal, the UE transmits the uplink signal using the physical antenna used during the first SRS transmission corresponding to the uplink signal.

In an embodiment, the UE transmits the uplink signal according to the first SRS transmission corresponding to the uplink signal, which includes: when the UE transmits the uplink signal, the antenna port of the SRS resource for the first SRS transmission is used as the antenna port corresponding to the uplink signal.

As can be seen from the above embodiments, the UE receives the first determination mode and/or the second determination mode transmitted by the network device, where the first determination mode is a mode for determining first SRS transmission corresponding to the uplink signal and the second determination mode is a mode for determining the first antenna port corresponding to the uplink signal, determines the first SRS transmission according to the first determination mode and/or determines the first antenna port according to the second determination mode, and transmits the uplink signal according to the first SRS transmission and/or the first antenna port, which can overcome the defect of low flexibility of configuring and triggering the SRS resource in the related art, and the effects of reducing congestion and improving transmission performance are achieved.

In an embodiment, the first SRS transmission in S701 can be one or more SRS transmissions of a given SRS resource; where the given SRS resource is an SRS resource indicated by an SRS resource indication information in scheduling information for the uplink signal. For example, the first SRS transmission corresponding to the uplink signal can be one or more SRS transmissions of an SRS resource indicated by the SRS resource indication information in the scheduling information for the uplink signal.

As can be seen from the foregoing embodiments, the first SRS transmission corresponding to the uplink signal can be one or more SRS transmissions of SRS resource indicated by the SRS resource indication information in the scheduling information for the uplink signal, which can improve the flexibility of configuring and triggering the SRS resource and achieve an effect of improving transmission performance.

In an embodiment, when performing S702, the method can include:

S7021, determining the first SRS transmission according to the first determination mode;

where when S7021 is performed, the method can include one or more of the followings:

scheme 1 for S7021, determining the first SRS transmission according to one or more SRS transmissions of a first SRS resource set and/or one or more SRS transmissions of a second SRS resource set; or scheme 2 for S7021, determining a second SRS transmission, and taking the second SRS transmission as the first SRS transmission; or scheme 3 for S7021, determining one or more SRS transmissions of a third SRS resource set as the first SRS transmission;

where the first SRS resource set is an SRS resource set with a given type that unmatched with a transmission mode of the uplink signal;

the second SRS resource set is an SRS resource set matched with the transmission mode of the uplink signal;

the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and the third SRS resource set is an SRS resource set indicated by SRS resource set indication information transmitted by the network device.

In an embodiment, the scheme 1 for S7021 can include one or more of the followings:

determining the first SRS transmission according to one or more SRS transmissions of the first SRS resource set in case that the network device configures no second SRS resource set for the UE; or determining the first SRS transmission from the one or more SRS transmissions of the first SRS resource set in case that the network device configures the first SRS resource set and the second SRS resource set for the UE simultaneously; or determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resource; or determining a third SRS transmission, and taking the third SRS transmission as the first SRS transmission; or determining a fourth SRS transmission, and taking the fourth SRS transmission as the first SRS transmission;

where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, the given type is a given usage type. For example, the given type is a usage for CSI acquisition of codebook PUSCH, for example, usage is set to "codebook" in NR system. As another example, the given type is a usage for CSI acquisition of non-codebook PUSCH, for example, usage is set to "non-codebook" in NR system. As another example, the given type is a usage for antenna switching or downlink CSI acquisition, for example, usage is set to "antennaSwitching" in NR system. As another example, the given type is a usage for beam management, for example, usage is set to "beamManagement" in NR system.

In an embodiment, the transmission mode of the uplink signal is a codebook based transmission scheme, and the SRS resource set unmatched with the transmission mode of the uplink signal is an SRS resource set with usage not set to "codebook". In case that the usage signaling of one SRS resource set is configured to be "codebook", the SRS resource set is an SRS resource set matched with the transmission mode of the uplink signal.

In an embodiment, the SRS resource set unmatched with the transmission mode of the uplink signal is an SRS resource set with usage set to "antennaSwitching".

In an embodiment, the SRS resource set unmatched with the transmission mode of the uplink signal is an SRS resource set with usage not set to a value corresponding to uplink CSI measurement.

In an embodiment, the SRS resource set unmatched with the transmission mode of the uplink signal is an SRS resource set with usage set to "antennaSwitching", or "non-codebook" or "beamManagement" or "positioning".

In an embodiment, the transmission mode of the uplink signal is a non-codebook based transmission scheme, and the SRS resource set unmatched with the transmission mode of the uplink signal is an SRS resource set with usage not set to "non-codebook". In case that the usage signaling of one SRS resource set is set to "non-codebook", the SRS resource set is an SRS resource set matched with the transmission mode of the uplink signal.

In an embodiment, the SRS resource set unmatched with the transmission mode of the uplink signal is an SRS resource set with usage set to "antennaSwitching".

In an embodiment, the SRS resource set unmatched with the transmission mode of the uplink signal an SRS resource set with usage not set to a value corresponding to the transmission mode of the uplink signal.

In an embodiment, the SRS resource set unmatched with the transmission mode of the uplink signal is an SRS resource set with usage set to "antennaSwitching", or "codebook", or "beamManagement", or "positioning".

In an embodiment, the transmission mode of the uplink signal is a codebook based transmission scheme, and the SRS resource set unmatched with the transmission mode of the uplink signal is an SRS resource set with usage not set to "codebook". For example, in case that the usage signaling of one SRS resource set is set to "codebook/antennaSwitching" or "codebook & antennaSwitching", the SRS resource set is an SRS resource set matched with the transmission mode of the uplink signal.

In an embodiment, the transmission mode of the uplink signal is a non-codebook based transmission scheme, and the SRS resource set unmatched with the transmission mode of the uplink signal is an SRS resource set with usage not set to "non-codebook". For example, in case that the usage signaling of one SRS resource set is set to "non-codebook/antennaSwitching" or "non-codebook & antennaSwitching, the SRS resource set is an SRS resource set matched with the transmission mode of the uplink signal.

In an embodiment, one or more SRS resources are simultaneously configured in the SRS resource set unmatched with the transmission mode of the uplink signal and the SRS resource set matched with the transmission mode of the uplink signal, where the SRS transmission corresponding to the SRS resource set unmatched with the transmission mode of the uplink signal is: an SRS transmission of the one or more same SRS resources in the SRS transmissions of the SRS resource set unmatched with the transmission mode of the uplink signal.

As can be seen from the foregoing embodiments, the first SRS transmission can be determined according to one or more SRS transmissions of the SRS resource set with a given type that unmatched with the transmission mode of the uplink signal and/or according to one or more SRS transmissions of the SRS resource set matched with the transmission mode of the uplink signal, which can improve the flexibility of configuring and triggering the SRS resource, and achieve the effect of improving the transmission performance.

In an embodiment, when the scheme 1 for S7021 is performed, one or more of the followings can be included.
  (1) The UE determines the first SRS transmission corresponding to the uplink signal according to one or more SRS transmissions of the SRS resource set with a given type that unmatched with the transmission mode of the uplink signal.

For example, the one or more SRS transmissions of the SRS resource set with a given type that unmatched with the transmission mode of the uplink signal can be determined as the first SRS transmission corresponding to the uplink signal.
  (2) The UE determines the first SRS transmission corresponding to the uplink signal according to one or more SRS transmissions of the SRS resource set matched with the transmission mode of the uplink signal.

For example, the one or more SRS transmissions of the SRS resource set matched with the transmission mode of the uplink signal can be determined as the first SRS transmission corresponding to the uplink signal.
  (3) The UE determines the first SRS transmission corresponding to the uplink signal according to one or more SRS transmissions of the SRS resource set with a given type that unmatched with the transmission mode of the uplink signal and one or more SRS transmissions of the SRS resource set matched with the transmission mode of the uplink signal.

In an embodiment, the given type can include one or more of the followings:
  usage is for CSI acquisition of codebook PUSCH, for example, usage signaling is set to "codebook" in NR system;
  usage is for CSI acquisition of non-codebook PUSCH, for example, usage signaling is set to "non-codebook" in NR system;
  usage is for antenna switching or downlink CSI acquisition; or usage is for beam management, for example, usage signaling is set to "beamManagement" in NR system.

As can be seen from the foregoing embodiments, the first determination mode transmitted by the network device includes the foregoing multiple manners, which can overcome the defect of low flexibility of configuring and triggering the SRS resource in the related art, and achieve the effects of reducing congestion and improving transmission performance.

In an embodiment, when S702 is performed, the method can include:
  S7022, the UE determines the first antenna port corresponding to the uplink signal according to the second determination mode;
  where the following schemes can be included when S7022 is performed:
  scheme 1 for S7022, the UE determines the first antenna port from an antenna port for one or more SRS transmissions of a fourth SRS resource set and/or an antenna port for one or more SRS transmissions of a fifth SRS resource set; or
  scheme 2 for S7022, the UE determines an antenna port for a fifth SRS transmission, and takes the antenna port for the fifth SRS transmission as the first antenna port; or
  scheme 3 for S7022, the UE determines an antenna port for one or more SRS transmissions of a sixth SRS resource set as the first antenna port;
  where the fourth SRS resource set is an SRS resource set with a given type that unmatched with a transmission mode of the uplink signal;
  the fifth SRS resource set is an SRS resource set matched with the transmission mode of the uplink signal;
  the fifth SRS transmission is the most recent SRS transmission of an SRS resource indicated by SRI in DCI which schedules the uplink signal, where the SRS resource is prior to a PDCCH carrying the DCI; and
  the sixth SRS resource set is an SRS resource set indicated by SRS resource set indication information transmitted by a network device.

In an embodiment, the scheme 1 for S7022 can include one or more of the followings:
  determining the first antenna port from the antenna port for one or more SRS transmissions of the fourth SRS resource set in case that the network device configures the fourth SRS resource set and the fifth SRS resource set for the UE simultaneously; or
  determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources; or
  determining an antenna port for a sixth SRS transmission and taking the antenna port for the sixth SRS transmission as the first antenna port; or
  determining an antenna port for a seventh SRS transmission and taking the antenna port for the seventh SRS transmission as the first antenna port;
  where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and
  the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal is located.

In an embodiment, the given type is a given usage type. For example, the given type is a usage for CSI acquisition of codebook PUSCH, for example, usage is set to "codebook" in NR system. As another example, the given type is a usage for CSI acquisition of non-codebook PUSCH, for example, usage is set to "non-codebook" in NR system. As another example, the given type is a usage for antenna switching or downlink CSI acquisition, for example, usage is set to "antennaSwitching" in NR system. As another example, the given type is a usage for beam management, for example, usage is set to "beamManagement" in NR system.

In an embodiment, the transmission mode of the uplink signal is a codebook based transmission scheme, and the SRS resource set unmatched with the transmission mode of the uplink signal is an SRS resource set with usage not set to "codebook". In case that the usage signaling of one SRS resource set is set to "codebook", the SRS resource set is an SRS resource set matched with the transmission mode of the uplink signal.

In an embodiment, the SRS resource set unmatched with the transmission mode of the uplink signal is an SRS resource set with usage signaling set to "antennaSwitching". In this embodiment, the second determination mode can indicate that one or more SRS transmissions of the SRS resource set with usage set to "antennaSwitching" can be used to determine information of the first antenna port corresponding to the uplink signal.

In an embodiment, the SRS resource set unmatched with the transmission mode of the uplink signal is an SRS resource set with usage not set to a value corresponding to uplink CSI measurement. In this embodiment, the second determination mode can indicate that one or more SRS transmissions of the SRS resource set with usage not set to "codebook" and "non-codebook" can be used to determine information of the first antenna port corresponding to the uplink signal.

In an embodiment, the SRS resource set unmatched with the transmission mode of the uplink signal is an SRS resource set with usage set to "antennaSwitching", or "non-codebook" or "beamManagement" or "positioning".

In an embodiment, the transmission mode of the uplink signal is a non-codebook based transmission scheme, and the SRS resource set unmatched with the transmission mode of the uplink signal is an SRS resource set with usage not set to "non-codebook". In case that the usage signaling of one SRS resource set is set to "non-codebook", the SRS resource set is an SRS resource set matched with the transmission mode of the uplink signal.

In an embodiment, the SRS resource set unmatched with the transmission mode of the uplink signal is an SRS resource set with usage set to "antennaSwitching".

In an embodiment, the SRS resource set unmatched with the transmission mode of the uplink signal is an SRS resource set with usage not set to a value corresponding to the transmission mode of the uplink signal.

In an embodiment, the SRS resource set unmatched with the transmission mode of the uplink signal is an SRS resource set with usage set to "antennaSwitching", or "codebook", or "beamManagement", or "positioning".

In an embodiment, the transmission mode of the uplink signal is a codebook based transmission scheme, and the SRS resource set unmatched with the transmission mode of the uplink signal is an SRS resource set with usage not set to "codebook". For example, in case that the usage signaling of one SRS resource set is set to "codebook/antennaSwitching" or "codebook & antennaSwitching", the SRS resource set is an SRS resource set matched with the transmission mode of the uplink signal.

In an embodiment, the transmission mode of the uplink signal is a non-codebook based transmission scheme, and the SRS resource set unmatched with the transmission mode of the uplink signal is an SRS resource set with usage not set to "non-codebook". For example, in case that the usage signaling of one SRS resource set is set to "non-codebook/antennaSwitching" or "non-codebook & antennaSwitching, the SRS resource set is an SRS resource set matched with the transmission mode of the uplink signal.

In an embodiment, one or more SRS resources are simultaneously configured in the SRS resource set unmatched with the transmission mode of the uplink signal and the SRS resource set matched with the transmission mode of the uplink signal, where the SRS transmission corresponding to the SRS resource set unmatched with the transmission mode of the uplink signal is: an SRS transmission of the one or more same SRS resources in the SRS transmissions of the SRS resource set unmatched with the transmission mode of the uplink signal.

As can be seen from the foregoing embodiments, the first antenna port can be determined according to the antenna port for one or more SRS transmissions of the SRS resource set with a given type that unmatched with the transmission mode of the uplink signal and/or according to the antenna port for one or more SRS transmissions of the SRS resource set matched with the transmission mode of the uplink signal, which can overcome the defect of low flexibility of configuring and triggering the SRS resource in the related art, and the effects of reducing congestion and improving transmission performance are achieved.

In an embodiment, when the scheme 1 for S7022 is performed, one or more of the followings can be included.

(1) The UE determines the first antenna port corresponding to the uplink signal according to the antenna port for one or more SRS transmissions of the SRS resource set with a given type that unmatched with the transmission mode of the uplink signal.

For example, the antenna port for one or more SRS transmissions of the SRS resource set with a given type that unmatched with the transmission mode of the uplink signal can be determined as the first antenna port corresponding to the uplink signal.

(2) The UE determines the first antenna port corresponding to the uplink signal according to the antenna port for one or more SRS transmissions of the SRS resource set matched with the transmission mode of the uplink signal.

For example, the antenna port for one or more SRS transmissions of the SRS resource set matched with the transmission mode of the uplink signal can be determined as the first antenna port corresponding to the uplink signal.

(3) The UE determines the first antenna port corresponding to the uplink signal according to the antenna port for one or more SRS transmissions of the SRS resource set with a given type that unmatched with the transmission mode of the uplink signal and the antenna port for one or more SRS transmissions of the SRS resource set matched with the transmission mode of the uplink signal.

In an embodiment, the given type can include one or more of the followings:
usage is for CSI acquisition of codebook PUSCH, for example, usage is set to "codebook" in NR system;
usage is for CSI acquisition of non-codebook PUSCH, for example, usage is set to "non-codebook" in NR system;
usage is for antenna switching or downlink CSI acquisition; or usage is for beam management, for example, usage signaling is set to "beamManagement" in NR system.

Specific embodiments can be referred to the description for the FIG. 2, FIG. 3, and FIG. 4, which are not described here again.

As can be seen from the foregoing embodiments, the UE can determine the first antenna port from the antenna port for one or more SRS transmissions of the SRS resource set with a given type that unmatched with the transmission mode of the uplink signal and/or according to the antenna port for one or more SRS transmissions of the SRS resource set matched with the transmission mode of the uplink signal, which can overcome the defect of low flexibility of configuring and triggering the SRS resource in the related art, and the effects of reducing congestion and improving transmission performance are achieved.

In an embodiment, when the transmission mode of the uplink signal in S7021 or S7022 is performed, the following cases can be included:
case 1, the transmission mode of the uplink signal includes a codebook based transmission scheme;
case 2, the transmission mode of the uplink signal includes a non-codebook based transmission scheme; and
case 3, the transmission mode of the uplink signal includes a codebook based transmission scheme and a non-codebook based transmission scheme;
where the SRS resource set matched with the codebook based transmission scheme in the first situation is an SRS resource set with usage set to codebook;
the SRS resource set matched with the non-codebook based transmission scheme in the second situation is an SRS resource set with usage set to non-codebook.

Specific embodiments can be referred to the description for the FIG. 5 and FIG. 6, which are not described here again.

As can be seen from the above embodiments, the transmission mode of the uplink signal includes the codebook based transmission scheme and/or the non-codebook based transmission scheme, where the SRS resource set matched with the codebook based transmission scheme is an SRS resource set with usage set to codebook, and the SRS resource set matched with the non-codebook based transmission scheme is an SRS resource set with usage set to non-codebook, which can overcome the defect of low flexibility of configuring and triggering the SRS resource in the related art, and the effects of reducing congestion and improving transmission performance are achieved.

In an embodiment, when performing the step S701 of receiving the first determination mode and/or the second determination mode transmitted by the network device, the method can include:
S7011, the UE receives the first determination mode and/or the second determination mode transmitted by the network device through a first indication signaling;
where the UE receives the first determination mode and/or the second determination mode can further include:
the UE receives first information for indicating SRS resource set transmitted by the network device through the first indication signaling or second indication signaling, where the second indication signaling is different from the first indication signaling.

For example, the first information is transmitted in the following two schemes.

Scheme 1:
the UE receives first information for indicating SRS resource set transmitted by the network device through first indication signaling, where the first indication signaling includes:
first information for indicating an SRS resource set;
the first SRS transmission is one or more SRS transmissions of an SRS resource set indicated by the first information; and/or the first antenna port is an antenna port for one or more SRS transmissions of the SRS resource set indicated by the first information.

Scheme 1:
the UE receives first information for indicating SRS resource set transmitted by the network device through second indication signaling, where the second indication signaling only includes the first information;
where the second indication signaling is different from the first indication signaling.

As can be seen from the foregoing embodiments, the first determination mode and/or the second determination mode transmitted by the network device can be received through the first indication signaling, and the first information for indicating SRS resource set transmitted by the network device can be received through the first indication signaling or the second indication signaling, where the second indication signaling is different from the first indication signaling, which can overcome the defect of low flexibility of configuring and triggering the SRS resource in the related art, and the effects of reducing congestion and improving transmission performance are achieved.

In an embodiment, when performing the step S701 of receiving the first determination mode and/or the second determination mode transmitted by the network device, the method can further include:
receiving a third indication information transmitted by the network device, where the third indication information is used for indicating a bit width of SRI information; and
determining the bit width of the SRI information according to the third indication information;
where the SRI information is used to indicate the SRS resource for the first SRS transmission corresponding to the uplink signal, the SRS resource for the first antenna port corresponding to the uplink signal, and the SRS resource for the first SRS transmission corresponding to the uplink signal and the SRS resource for the first antenna port corresponding to the uplink signal.

In an embodiment, the bit width of the SRI information is determined by the network device according to the number of SRS resources included in a seventh SRS resource set;
where the seventh SRS resource set includes all SRS resource sets for determining the first SRS transmission.

For example, the bit width of the SRI information indicated by the third indication information transmitted by the network device is determined by the network device according to the number of SRS resources included by all SRS resource sets for determining the first SRS transmission.

It can be seen from the foregoing embodiments that by receiving the third indication information transmitted by the network device, where the third indication information is used for indicating the bit width of SRI information, and determining the bit width of the SRI information according to the third indication information, where the bit width is determined by the network device according to the number of SRS resources included in all SRS resource sets for determining the first SRS transmission, the defect of low flexibility of configuring and triggering the SRS resource in the related art can be overcome, and the effects of reducing congestion and improving transmission performance are achieved.

In an embodiment, before S701 is performed, the method can further include:

determining, by the UE, UE capability information; and transmitting, by the UE, the UE capability information to the network device for the network device to determine the first determination mode and/or the second determination mode transmitted by the network device according to the UE capability information determined by the UE.

As can be seen from the foregoing embodiments, the UE receives the first determination mode and/or the second determination mode transmitted by the network device, where the first determination mode is a mode for determining first SRS transmission corresponding to the uplink signal and the second determination mode is a mode for determining first antenna port corresponding to the uplink signal, determines the first antenna port and/or the first SRS transmission according to the first determination mode and/or the second determination mode, and transmits the uplink signal according to the first SRS transmission and/or the first antenna port, which can overcome the defect of low flexibility of configuring and triggering the SRS resource in the related art, and the effects of reducing congestion and improving transmission performance are achieved.

Figure 8:
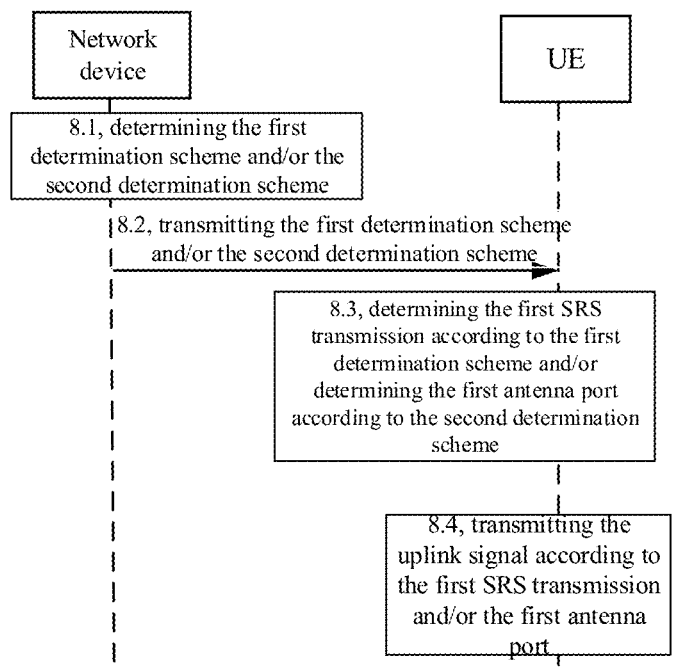
FIG. 8 is a schematic information interaction diagram of a signal transmission method according to an embodiment of the present application.

FIG. 8 is a schematic information interaction diagram of a signal transmission method according to an embodiment of the present application, and as shown in FIG. 8, an information transmission process between a network device and a UE includes:

8.1, the network device determines a first determination mode and/or a second determination mode, where the first determination mode is a mode for determining a first SRS transmission corresponding to an uplink signal and the second determination mode is a mode for determining a first antenna port corresponding to the uplink signal;

8.2, the network device transmits the first determination mode and/or the second determination mode to the UE;

8.3, the UE determines the first SRS transmission according to the first determination mode and/or determines the first antenna port according to the second determination mode; and 8.4, the UE transmits the uplink signal according to the first SRS transmission and/or the first antenna port.

The specific signal transmission method and process at the network device side and the UE side have been described in detail in the embodiments for FIG. 1 and FIG. 7, which are not described here again.

As can be seen from the embodiments of the present application, by determining the first determination mode and/or the second determination mode, where the first determination mode is a mode for determining the first SRS transmission corresponding to the uplink signal and the second determination mode is a mode for determining the first antenna port corresponding to the uplink signal, and transmitting the first determination mode and/or the second determination mode to the UE and the UE determines the first SRS transmission according to the first determination mode and/or determines the first antenna port according to the second determination mode, and transmits the uplink signal according to the first SRS transmission and/or the first antenna port, the defect of low flexibility of configuring and triggering the SRS resource in the related art can be overcame, and the effects of reducing congestion and improving transmission performance are achieved.

Figure 9:
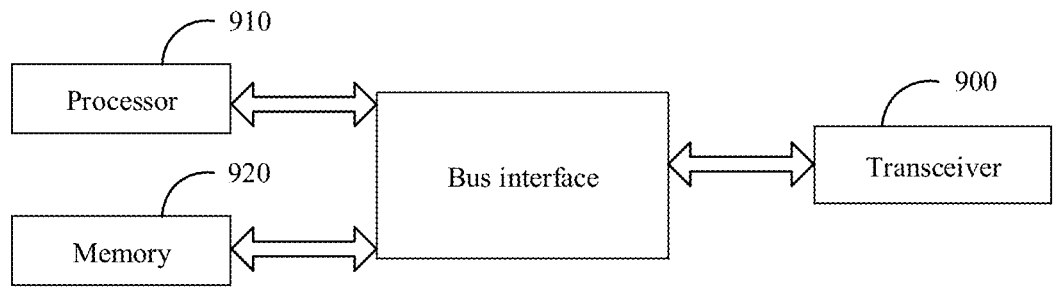
FIG. 9 is a schematic structural diagram of a signal transmission apparatus according to an embodiment of the present application.

FIG. 9 shows a signal transmission apparatus provided by an embodiment of the present application. As shown in FIG. 9, the signal transmission apparatus includes: a memory 920, a transceiver 900 and a processor 910.

In FIG. 9, a bus architecture can include any number of interconnected buses and bridges, which are linked together through various circuits of one or more processors represented by processor 910 and one or more memories represented by the memory 920. The bus architecture can further link together various other circuits, such as peripherals, voltage regulators, and power management circuits. The bus interface provides an interface. Transceiver 900 can be multiple elements, i.e., including a transmitter and a receiver, and the transceiver 900 provides units for communicating with various other devices over transmission media including wireless channels, wired channels, fiber optic cables, and the like. The processor 910 is responsible for managing the bus architecture and general processing, and the memory 920 can store data used by the processor 910 when performing operations.

The processor 910 can be a central processing unit (CPU), an application specific integrated circuit (ASIC), a field-programmable gate array (FPGA), or a complex programmable logic device (CPLD), the processor can also use a multi-core architecture.

The memory 920 is configured to store a computer program; the transceiver 900 is configured to transmit and receive data under a control of the processor 910; and the processor 910 is configured to read the computer program in the memory 920 and perform the following operations of:

determining a first determination mode and/or a second determination mode, where the first determination mode is a mode for determining a first sounding reference signal (SRS) transmission corresponding to an uplink signal, and the second determination mode is a mode for determining a first antenna port corresponding to the uplink signal; and transmitting the first determination mode and/or the second determination mode to a user equipment (UE), the first determination mode is used for determining the first SRS transmission and/or the second determination mode is used for determining the first antenna port and the uplink signal is transmitted according to the first SRS transmission and/or the first antenna port.

In an embodiment, according to the above signal transmission apparatus, the first SRS transmission is one or more SRS transmissions of an SRS resource indicated by SRS resource indication information in scheduling information for the uplink signal.

In an embodiment, according to the above signal transmission apparatus, the first determination mode includes:

determining the first SRS transmission according to one or more SRS transmissions of a first SRS resource set and/or one or more SRS transmissions of a second SRS resource set; or determining a second SRS transmission, and taking the second SRS transmission as the first SRS transmission; or determining one or more SRS transmissions of a third SRS resource set as the first SRS transmission;

where the first SRS resource set is an SRS resource set with a given type that unmatched with a transmission mode of the uplink signal;

the second SRS resource set is an SRS resource set matched with the transmission mode of the uplink signal;

the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and the third SRS resource set is an SRS resource set indicated by SRS resource set indication information transmitted by a network device.

In an embodiment, according to the above signal transmission apparatus, the determining the first SRS transmission according to one or more SRS transmissions of the first SRS resource set and/or one or more SRS transmissions of the second SRS resource set includes one or more of:

determining the first SRS transmission from the one or more SRS transmissions of the first SRS resource set in case that the network device configures the first SRS resource set and the second SRS resource set for the UE simultaneously; or determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources; or determining a third SRS transmission, and taking the third SRS transmission as the first SRS transmission; or determining a fourth SRS transmission, and taking the fourth SRS transmission as the first SRS transmission;

where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, according to the above signal transmission apparatus, the second determination mode includes:

determining the first antenna port according to an antenna port for one or more SRS transmissions of a fourth SRS resource set and/or an antenna port for one or more SRS transmissions of a fifth SRS resource set; or determining an antenna port for a fifth SRS transmission, and taking the antenna port for the fifth SRS transmission as the first antenna port; or taking an antenna port for one or more SRS transmissions of a sixth SRS resource set as the first antenna port;

where the fourth SRS resource set is an SRS resource set with a given type that unmatched with a transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is an SRS resource set indicated by SRS resource set indication information transmitted by a network device.

In an embodiment, according to the above signal transmission apparatus, the determining the first antenna port according to the antenna port for one or more SRS transmissions of the fourth SRS resource set and/or the antenna port for one or more SRS transmissions of the fifth SRS resource set includes one or more of:

determining the first antenna port from the antenna port for the one or more SRS transmissions of the fourth SRS resource set in case that the network device configures the fourth SRS resource set and the fifth SRS resource set for the UE simultaneously; or determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources;

determining an antenna port for a sixth SRS transmission, and taking the antenna port for the sixth SRS transmission as the first antenna port; or determining an antenna port for a seventh SRS transmission, and taking the antenna port for the seventh SRS transmission as the first antenna port;

where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the above signal transmission apparatus, the transmission mode of the uplink signal includes a codebook based transmission scheme and/or a non-codebook based transmission scheme;

an SRS resource set matched with the codebook based transmission scheme is an SRS resource set with usage set to codebook; and an SRS resource set matched with the non-codebook based transmission scheme is an SRS resource set with usage set to non-codebook.

In an embodiment, according to the above signal transmission apparatus, the transmitting the first determination mode and/or the second determination mode to the UE includes:

transmitting the first determination mode and/or the second determination mode to the UE through a first indication signaling;

the processor 910 further performs the following operations of:

determining first information for indicating SRS resource set; and transmitting the first information to the UE through the first indication signaling or second indication signaling, where the second indication signaling is different from the first indication signaling;
where the first indication signaling includes:
the first information; and
the first determination mode and/or the second determination mode; where the first determination mode includes: the first SRS transmission is one or more SRS transmissions of an SRS resource set indicated by the first information; the second determination mode includes: the first antenna port is an antenna port for one or more SRS transmissions of the SRS resource set indicated by the first information.

In an embodiment, the processor 910 further performs the following operations of:
transmitting third indication information to the UE, where the third indication information is used for indicating a bit width of SRI information;
where the SRI is used for indicating SRS resources for the first SRS transmission and/or SRS resource for the first antenna port.

In an embodiment, according to the above signal transmission apparatus, the bit width is determined by the network device according to the number of SRS resources included in a seventh SRS resource set;
where the seventh SRS resource set includes all SRS resource sets for determining the first SRS transmission.

In an embodiment, the processor 910 further performs the following operations of:
receiving UE capability information transmitted by the UE; and
determining the first determination mode and/or the second determination mode according to the UE capability information.

As can be seen from the above embodiment, by determining the first determination mode and/or the second determination mode, where the first determination mode is a mode for determining the first SRS transmission corresponding to the uplink signal, and the second determination mode is a mode for determining the first antenna port corresponding to the uplink signal, and transmitting the first determination mode and/or the second determination mode to the UE, the first determination mode is used for determining the first SRS transmission and/or the second determination mode is used for determining the first antenna port and the uplink signal is transmitted according to the first SRS transmission and/or the first antenna port, the defects of inflexible transmission scheme and low flexibility of configuring and triggering the SRS resource caused by the scheme of only one uplink signal antenna port and/or SRS transmission can be overcame, the network congestion degree is reduced, and the flexibility of signal transmission is improved.

Figure 10:
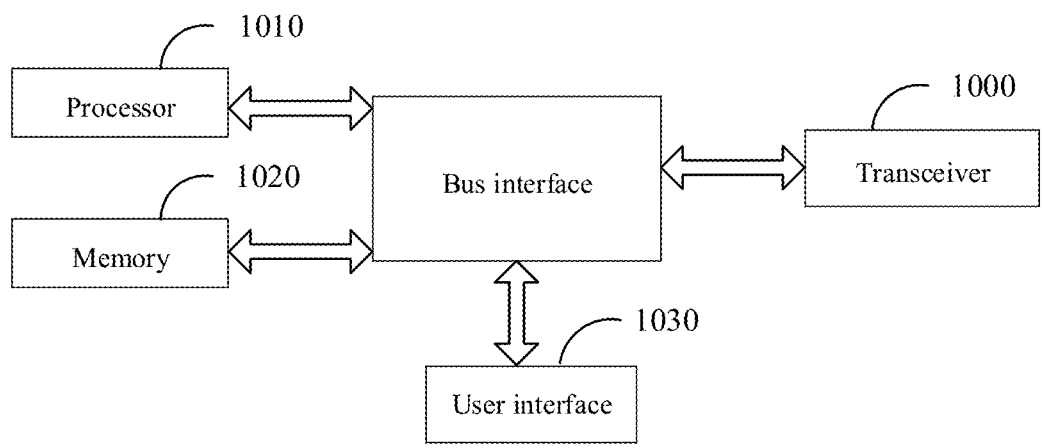
FIG. 10 is a schematic structural diagram of a signal transmission apparatus according to an embodiment of the present application.

FIG. 10 is a schematic structural diagram of a signal transmission apparatus according to an embodiment of the present application, where the signal transmission apparatus includes: a memory, a transceiver and a processor;
the memory is configured to store a computer program; the transceiver is configured to transmit and receive data under a control of the processor; and the processor is configured to read the computer program in the memory and perform the following operations of:
receiving a first determination mode and/or a second determination mode transmitted by a network device, where the first determination mode is a mode for determining a first sounding reference signal (SRS) transmission corresponding to an uplink signal, and the second determination mode is a mode for determining a first antenna port corresponding to the uplink signal;
determining the first SRS transmission according to the first determination mode, and/or determining the first antenna port according to the second determination mode; and
transmitting the uplink signal according to the first SRS transmission and/or the first antenna port.

In an embodiment, according to the above signal transmission apparatus, the first SRS transmission is one or more SRS transmissions of a given SRS resource; where the given SRS resource is an SRS resource indicated by SRS resource indication information in scheduling information for the uplink signal.

In an embodiment, according to the above signal transmission apparatus, the determining the first SRS transmission according to the first determination mode includes:
determining the first SRS transmission from one or more SRS transmissions of a first SRS resource set and/or one or more SRS transmissions of a second SRS resource set; or
determining a second SRS transmission, and taking the second SRS transmission as the first SRS transmission; or
determining one or more SRS transmissions of a third SRS resource set as the first SRS transmission;
where the first SRS resource set is an SRS resource set with a given type that unmatched with a transmission mode of the uplink signal;
the second SRS resource set is an SRS resource set matched with the transmission mode of the uplink signal;
the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and
the third SRS resource set is an SRS resource set indicated by SRS resource set indication information transmitted by the network device.

In an embodiment, according to the above signal transmission apparatus, the determining the first SRS transmission according to one or more SRS transmissions of the first SRS resource set and/or one or more SRS transmissions of the second SRS resource set includes one or more of:
determining the first SRS transmission from the one or more SRS transmissions of the first SRS resource set in case that the network device configures no second SRS resource set for the UE; or
determining the first SRS transmission from the one or more SRS transmissions of the first SRS resource set in case that the network device configures the first SRS resource set and the second SRS resource set for the UE simultaneously; or
determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources; or
determining a third SRS transmission, and taking the third SRS transmission as the first SRS transmission; or
determining a fourth SRS transmission, and taking the fourth SRS transmission as the first SRS transmission;

where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, according to the above signal transmission apparatus, the determining the first antenna port according to the second determination mode includes:

determining the first antenna port according to an antenna port for one or more transmissions of a fourth SRS resource set and/or an antenna port for one or more SRS transmissions of a fifth SRS resource set; or determining an antenna port for a fifth SRS transmission, and taking the antenna port for the fifth SRS transmission as the first antenna port; or determining an antenna port for one or more SRS transmissions of a sixth SRS resource set as the first antenna port;

where the fourth SRS resource set is an SRS resource set with a given type that unmatched with a transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is an SRS resource set indicated by SRS resource set indication information transmitted by a network device.

In an embodiment, according to the above signal transmission apparatus, the determining the first antenna port according to the antenna port for one or more SRS transmissions of the fourth SRS resource set and/or the antenna port for one or more SRS transmissions of the fifth SRS resource set, includes:

determining the first antenna port from the antenna port for the one or more SRS transmissions of the fourth SRS resource set in case that the network device configures no fifth SRS resource set for the UE; or determining the first antenna port from the antenna port for the one or more SRS transmissions of the fourth SRS resource set in case that the network device configures the fourth SRS resource set and the fifth SRS resource set for the UE simultaneously; or determining the first antenna port from the antenna port for the one or more SRS transmissions of the fifth SRS resource set in case that the network device configures no fourth SRS resource set for the UE; or determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources; or determining an antenna port for a sixth SRS transmission, and taking the antenna port for the sixth SRS transmission as the first antenna port; or determining an antenna port for a seventh SRS transmission, and taking the antenna port for the seventh SRS transmission as the first antenna port;

where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the above signal transmission apparatus, the transmission mode of the uplink signal includes a codebook based transmission scheme and/or a non-codebook based transmission scheme;

an SRS resource set matched with the codebook based transmission scheme is an SRS resource set with usage set to codebook; and an SRS resource set matched with the non-codebook based transmission scheme is an SRS resource set with usage set to non-codebook.

In an embodiment, according to the above signal transmission apparatus, the receiving the first determination mode and/or the second determination mode transmitted by the network device includes:

receiving the first determination mode and/or the second determination mode transmitted by the network device through a first indication signaling;

the processor further performs the following operations of:

receiving first information for indicating SRS resource set transmitted by the network device through the first indication signaling or second indication signaling, where the second indication signaling is different from the first indication signaling;

where the first indication signaling includes:

the first information; and the first determination mode and/or the second determination mode; where the first determination mode includes: the first SRS transmission is one or more SRS transmissions of an SRS resource set indicated by the first information; the second determination mode includes: the first antenna port is an antenna port for one or more SRS transmissions of the SRS resource set indicated by the first information.

In an embodiment, the processor further performs the following operations of:

receiving third indication information transmitted by the network device, where the third indication information is used for indicating a bit width of SRI information; and determining the bit width of the SRI information according to the third indication information;

where the SRI is used for indicating SRS resource for the first SRS transmission and/or SRS resource for the first antenna port.

In an embodiment, according to the above signal transmission apparatus, the bit width is determined by the network device according to the number of SRS resources included by all SRS resource sets for determining the first SRS transmission.

In an embodiment, the processor further performs the following operations of:
determining UE capability information; and
transmitting the UE capability information to the network device, where the UE capability information is used for determining the first determination mode and/or the second determination mode for the network device.

As can be seen from the above embodiment, by receiving the first determination mode and/or the second determination mode transmitted by the network device, where the first determination mode is a mode for determining the first SRS transmission corresponding to the uplink signal and the second determination mode is a mode for determining the first antenna port corresponding to the uplink signal, determining the first SRS transmission according to the first determination mode and/or determining the first antenna port according to the second determination mode, and transmitting the uplink signal according to the first SRS transmission and/or the first antenna port, the defects of inflexible transmission scheme and low flexibility of configuring and triggering the SRS resource caused by the scheme of only one uplink signal antenna port and/or SRS transmission in the related art can be overcome, the network congestion degree is reduced, and the flexibility of signal transmission is improved.

Figure 11:
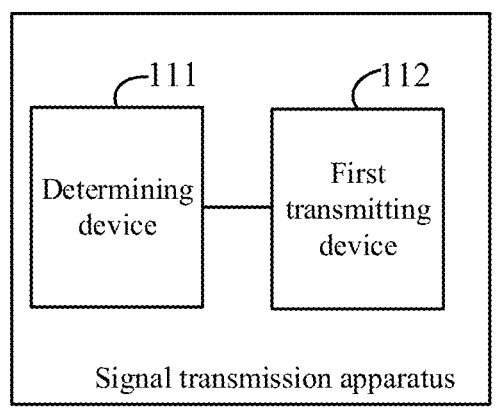
FIG. 11 is a schematic structural diagram of a signal transmission apparatus according to an embodiment of the present application.

FIG. 11 is a schematic structural diagram of a signal transmission apparatus according to an embodiment of the present application, where the apparatus is applied to a network device and includes:
a determining device 111, configured to determine a first determination mode and/or a second determination mode, where the first determination mode is a mode for determining a first sounding reference signal (SRS) transmission corresponding to an uplink signal, and the second determination mode is a mode for determining a first antenna port corresponding to the uplink signal; and
a first transmitting device 112, configured to transmit the first determination mode and/or the second determination mode to a user equipment (UE), the first determination mode is used for determining the first SRS transmission and/or the second determination mode is used for determining the first antenna port and the uplink signal is transmitted according to the first SRS transmission and/or the first antenna port.

In an embodiment, in the determining device 111, the first SRS transmission is one or more SRS transmissions of a given SRS resource; where the given SRS resource is an SRS resource indicated by SRS resource indication information in scheduling information for the uplink signal.

In an embodiment, the determining device 111 includes:
a first sub-device for the first determination mode, configured to determine the first SRS transmission according to one or more SRS transmissions of a first SRS resource set and/or one or more SRS transmissions of a second SRS resource set; or
a second sub-device for the first determination mode, configured to determine a second SRS transmission, and take the second SRS transmission as the first SRS transmission; or
a third sub-device for the first determination mode, configured to determine one or more SRS transmissions of a third SRS resource set as the first SRS transmission;
where the first SRS resource set is an SRS resource set with a given type that unmatched with a transmission mode of the uplink signal;
the second SRS resource set is an SRS resource set matched with the transmission mode of the uplink signal;
the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and
the third SRS resource set is an SRS resource set indicated by SRS resource set indication information transmitted by a network device.

In an embodiment, the first sub-device for the first determination mode includes one or more of:
a first unit, configured to determine the first SRS transmission from the one or more SRS transmissions of the first SRS resource set in case that the network device configures the first SRS resource set and the second SRS resource set for the UE simultaneously;
a second unit, configured to determine the first SRS transmission from SRS transmission of one or more same SRS resources in the first SRS resource set in case that the network device configures the first SRS resource set and the second SRS resource set for the UE simultaneously, and the first SRS resource set and the second SRS resource set include one or more same SRS resources;
a third unit, configured to determine a third SRS transmission and take the third SRS transmission as the first SRS transmission;
a fourth unit, configured to determine a fourth SRS transmission and take the fourth SRS transmission as the first SRS transmission;
where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and
the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, the determining device 111 includes:
a first sub-device for the second determination mode, configured to determine the first antenna port according to an antenna port for one or more SRS transmissions of a fourth SRS resource set and/or an antenna port for one or more SRS transmissions of a fifth SRS resource set; or
a second sub-device for the second determination mode, configured to determine an antenna port for fifth SRS transmission, and take the antenna port for fifth SRS transmission as the first antenna port; or
a third sub-device of the second determination mode, configured to determine an antenna port for one or more SRS transmissions of a sixth SRS resource set as the first antenna port;
where the fourth SRS resource set is an SRS resource set with a given type that unmatched with a transmission mode of the uplink signal;
the fifth SRS resource set is an SRS resource set matched with the transmission mode of the uplink signal;
the fifth SRS transmission is the most recent SRS transmission of an SRS resource indicated by SRI in DCI which schedules the uplink signal, where the SRS resource is prior to a PDCCH carrying the DCI; and
the sixth SRS resource set is an SRS resource set indicated by SRS resource set indication information transmitted by a network device.

In an embodiment, the first sub-device for the second determination mode includes one or more of:
a fifth unit, configured to determine the first antenna port from the antenna port for the one or more SRS transmissions of the fourth SRS resource set in case that the network device configures the fourth SRS resource set and the fifth SRS resource set for the UE simultaneously;
a sixth unit, configured to determine the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources;
a seventh unit, configured to determine an antenna port for sixth SRS transmission, and take the antenna port for the sixth SRS transmission as the first antenna port; or
an eighth unit, configured to determine an antenna port for a seventh SRS transmission, and take the antenna port for the seventh SRS transmission as the first antenna port;
where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and
the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the above signal transmission apparatus, the transmission mode of the uplink signal includes a codebook based transmission scheme and/or a non-codebook based transmission scheme;
an SRS resource set matched with the codebook based transmission scheme is an SRS resource set with usage set to codebook; and
an SRS resource set matched with the non-codebook based transmission scheme is an SRS resource set with usage set to non-codebook.

In an embodiment, the first transmitting device 112 includes:
a first sub-device for the first transmitting device, configured to transmit the first determination mode and/or the second determination mode to the UE through a first indication signaling;
the signal transmission method further includes:
determining first information for indicating SRS resource set; and
a second sub-device for the first transmitting device, configured to transmit the first information to the UE through the first indication signaling or second indication signaling, where the second indication signaling is different from the first indication signaling;
where the first indication signaling includes:
the first information; and
the first determination mode and/or the second determination mode; where the first determination mode includes: the first SRS transmission is one or more SRS transmissions of an SRS resource set indicated by the first information; the second determination mode includes: the first antenna port is an antenna port for one or more SRS transmissions of the SRS resource set indicated by the first information.

In an embodiment, according to the above signal transmission apparatus, third indication information is transmitted to the UE, where the third indication information is used for indicating a bit width of SRI information;
where the SRI is used for indicating SRS resource for the first SRS transmission and/or is used for indicating SRS resource for the first antenna port.

In an embodiment, according to the above signal transmission apparatus, the bit width is determined by the network device according to the number of SRS resources included in a seventh SRS resource set;
where the seventh SRS resource set includes all SRS resource sets for determining the first SRS transmission.

In an embodiment, the signal transmission apparatus further includes:
a receiving device, configured to receive UE capability information transmitted by the UE;
a determining device for the UE capability information, configured to determine the first determination mode and/or the second determination mode according to the UE capability information.

As can be seen from the above embodiments, by determining the first determination mode and/or the second determination mode, where the first determination mode is a mode for determining the first SRS transmission corresponding to the uplink signal, and the second determination mode is a mode for determining the first antenna port corresponding to the uplink signal, and transmitting the first determination mode and/or the second determination mode to the UE, the first determination mode is used for determining the first SRS transmission and/or the second determination mode is used for determining the first antenna port and the uplink signal is transmitted according to the first SRS transmission and/or the first antenna port, the defects of inflexible transmission scheme and low flexibility of configuring and triggering the SRS resource caused by the scheme of only one uplink signal antenna port and/or SRS transmission in the related art can be overcame, the network congestion degree is reduced, and the flexibility of signal transmission is improved.

Figure 12:
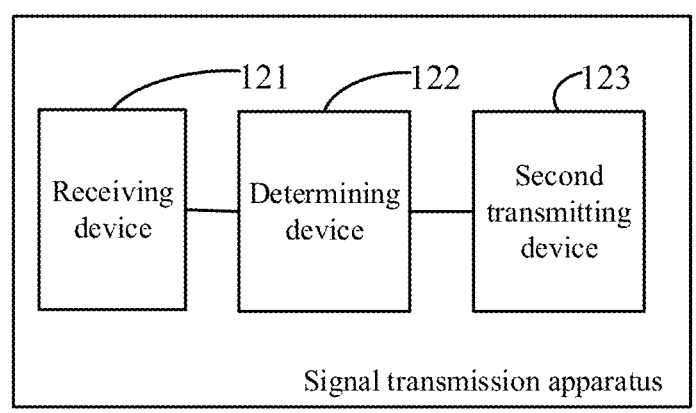
FIG. 12 is a schematic structural diagram of a signal transmission apparatus according to an embodiment of the present application.

FIG. 12 is a schematic structural diagram of a signal transmission apparatus according to an embodiment of the present application, where the apparatus is applied to a UE and includes:
a receiving device 121, configured to receive a first determination mode and/or a second determination mode transmitted by a network device, where the first determination mode is a mode for determining a first sounding reference signal (SRS) transmission corresponding to an uplink signal, and the second determination mode is a mode for determining a first antenna port corresponding to the uplink signal;
a determining device 122, configured to determine the first SRS transmission according to the first determination mode, and/or determine the first antenna port according to the second determination mode;
a second transmitting device 123, configured to transmit the uplink signal according to the first SRS transmission and/or the first antenna port.

In an embodiment, according to the above signal transmission apparatus, the first SRS transmission is one or more SRS transmissions of a given SRS resource; where the given SRS resource is an SRS resource indicated by SRS resource indication information in scheduling information for the uplink signal.

In an embodiment, the determining device 122 includes:
a first sub-device for receiving device, configured to determine the first SRS transmission according to one or more SRS transmissions of a first SRS resource set and/or one or more SRS transmissions of a second SRS resource set; or
a second sub-device for receiving device, configured to determine a second SRS transmission and take the second SRS transmission as the first SRS transmission; or
a third sub-device for receiving device, configured to determine one or more SRS transmissions of a third SRS resource set as the first SRS transmission;
where the first SRS resource set is an SRS resource set with a given type that unmatched with a transmission mode of the uplink signal;
the second SRS resource set is an SRS resource set matched with the transmission mode of the uplink signal;
the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and
the third SRS resource set is an SRS resource set indicated by SRS resource set indication information transmitted by the network device.

In an embodiment, the first sub-device for receiving device includes one or more of:
a first unit, configured to determine the first SRS transmission from one or more SRS transmissions of the first SRS resource set in case that the network device configures no second SRS resource set for the UE;
a second unit, configured to determine the first SRS transmission from the one or more SRS transmissions of the first SRS resource set in case that the network device configures the first SRS resource set and the second SRS resource set for the UE simultaneously;
a third unit, configured to determine the first SRS transmission from SRS transmission of one or more same SRS resources in the first SRS resource set in case that the network device configures the first SRS resource set and the second SRS resource set for the UE simultaneously, and the first SRS resource set and the second SRS resource set include one or more same SRS resources;
a fourth unit, configured to determine a third SRS transmission and take the third SRS transmission as the first SRS transmission;
a fifth unit, configured to determine a fourth SRS transmission and take the fourth SRS transmission as the first SRS transmission;
where the third SRS transmission is an SRS transmission of SRS resource indicated by SRI in DCI which schedules the uplink signal in the most recent transmission of the second SRS resource set, where the second SRS resource set is prior to a PDCCH carrying the DCI; and
the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

In an embodiment, the determining device 122 includes:
a first sub-device for determining device, configured to determine the first antenna port from an antenna port for one or more SRS transmissions of a fourth SRS resource set and/or an antenna port for one or more SRS transmissions of a fifth SRS resource set; or
a second sub-device for determining device, configured to determine an antenna port for fifth SRS transmission and take the antenna port for fifth SRS transmission as the first antenna port; or
a third sub-device for determining device, configured to determine an antenna port for one or more SRS transmissions of a sixth SRS resource set as the first antenna port;
where the fourth SRS resource set is an SRS resource set with a given type that unmatched with a transmission mode of the uplink signal;
the fifth SRS resource set is an SRS resource set matched with the transmission mode of the uplink signal;
the fifth SRS transmission is the most recent SRS transmission of an SRS resource indicated by SRI in DCI which schedules the uplink signal, where the SRS resource is prior to a PDCCH carrying the DCI; and
the sixth SRS resource set is an SRS resource set indicated by SRS resource set indication information transmitted by a network device.

In an embodiment, the first sub-device for determining device includes:
a sixth unit, configured to determine the first antenna port from the antenna port for one or more SRS transmissions of the fourth SRS resource set in case that the network device configures no fifth SRS resource set for the UE; or
a seventh unit, configured to determine the first antenna port from the antenna port for the one or more SRS transmissions of the fourth SRS resource set in case that the network device configures the fourth SRS resource set and the fifth SRS resource set for the UE simultaneously; or
an eighth unit, configured to determine the first antenna port from the antenna port for one or more SRS transmissions of the fifth SRS resource set in case that the network device configures no fourth SRS resource set for the UE;
a ninth unit, configured to determine the first antenna port from an antenna port for SRS transmission of one or more same SRS resources in the fourth SRS resource set in case that the network device configures the fourth SRS resource set and the fifth SRS resource set for the UE simultaneously, and the fourth SRS resource set and the fifth SRS resource set include one or more same SRS resources;
a tenth unit, configured to determine an antenna port for a sixth SRS transmission and take the antenna port for sixth SRS transmission as the first antenna port; or an eleventh unit, configured to determine an antenna port for a seventh SRS transmission, and take the antenna port for seventh SRS transmission as the first antenna port;
where the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

In an embodiment, according to the above signal transmission apparatus, the transmission mode of the uplink signal includes a codebook based transmission scheme and/or a non-codebook based transmission scheme;
   an SRS resource set matched with the codebook based transmission scheme is an SRS resource set with usage set to codebook; and
   an SRS resource set matched with the non-codebook based transmission scheme is an SRS resource set with usage set to non-codebook.

In an embodiment, the receiving device 121 includes:
   a fourth sub-device for receiving device, configured to receive the first determination mode and/or the second determination mode transmitted by the network device through a first indication signaling;
   the receiving device 121 further includes:
   a fifth sub-device for receiving device, configured to receive first information for indicating SRS resource set transmitted by the network device through the first indication signaling or second indication signaling, where the second indication signaling is different from the first indication signaling;
   where the first indication signaling includes:
   the first information; and
   the first determination mode and/or the second determination mode; where the first determination mode includes: the first SRS transmission is one or more SRS transmissions of an SRS resource set indicated by the first information; the second determination mode includes: the first antenna port is an antenna port for one or more SRS transmissions of the SRS resource set indicated by the first information.

In an embodiment, the receiving device 121 is further configured to:
   receive third indication information transmitted by the network device, where the third indication information is used for indicating a bit width of SRI information;
   determine the bit width of the SRI information according to the third indication information;
   where the SRI is used for indicating SRS resource for the first SRS transmission and/or is used for indicating SRS resource for the first antenna port.

In an embodiment, according to the signal transmission apparatus:
   the bit width is determined by the network device according to the number of SRS resources included in a seventh SRS resource set;
   where the seventh SRS resource set includes all SRS resource sets for determining the first SRS transmission.

In an embodiment, the signal transmission apparatus further includes:
   a UE capability information transmitting device, configured to determine the UE capability information; transmit the UE capability information to the network device, where the UE capability information is used for determining the first determination mode and/or the second determination mode for the network device.

As can be seen from the above embodiments, the receiving device is configured to receive the first determination mode and/or the second determination mode transmitted by the network device, where the first determination mode is a mode for determining the first SRS transmission corresponding to the uplink signal and the second determination mode is a mode for determining the first antenna port corresponding to the uplink signal, the determining device is configured to determine the first SRS transmission according to the first determination mode, and/or determine the first antenna port according to the second determination mode, and the second transmitting device is configured to transmit the uplink signal according to the first SRS transmission and/or the first antenna port, and the defects of inflexible transmission scheme and low flexibility of configuring and triggering the SRS resource caused by the scheme of only one uplink signal antenna port and/or SRS transmission in the related art can be overcame, the network congestion degree is reduced, and the flexibility of signal transmission is improved.

It should be noted that the division of units in the embodiments of the present application is schematic, which is only a logical function division, and there can be another division method in the actual implementation. In addition, various functional units in various embodiments of the present application can be integrated in one processing unit, or can be physically independent units, or two or more units can be integrated in one unit. The above integrated unit can be implemented in the form of hardware or software functional unit.

When the integrated unit is implemented in the form of software functional unit and sold or used as an independent product, it can be stored in a processor readable storage medium. Based on such understanding, the solutions of the present application in essence or the part of the solutions that contributes to the related art or part of the solutions can be embodied in the form of a software product, and the computer software product is stored in a storage medium and includes several instructions to cause a computer device (which can be a personal computer, a server, or a network device or the like) or a processor to perform all or part of the steps of the methods described in the various embodiments of the present application. The foregoing storage medium includes: USB flash memory, removable hard disk, read-only memory (ROM), random access memory (RAM), magnetic disk or optical disk and other mediums that can store program codes.

It should be noted that the above apparatuses according to the embodiments of the present application can implement all the method steps implemented by the above method embodiments and can achieve the same effect. The same part and beneficial effect of the apparatus embodiments with the method embodiments are not repeated in detail here.

An embodiment of the present application provides a non-transitory computer readable storage medium, storing computer programs, where the computer programs, when executed by the processor, cause the processor to perform the signal transmission method applied to the network device or the signal transmission method applied to the UE.

The processor readable storage medium can be any available medium or data storage device that can be accessed by the processor, including but not limited to magnetic memory (such as floppy disk, hard disk, magnetic tape, magneto-optical disk (MO), etc.), optical memory (such as CD, DVD, BD, HVD, etc.), and semiconductor memory (such as ROM, EPROM, EEPROM, non-volatile memory (NAND FLASH), solid state disk (SSD)), etc.

Embodiments of the present application can be provided as method, system, or computer program product. The present application can adopt the form of a complete hardware embodiment, a complete software embodiment, or an embodiment combining software and hardware aspects. Furthermore, the present application can adopt the form of a computer program product implemented on one or more computer usable storage media (including but not limited to disk memory, optical memory, etc.) including computer usable program codes.

The present application is described with reference to the flow chart and/or block diagram of the method, apparatus, device (system), and computer program product according to the embodiments of the present application. It shall be understood that each flow and/or block in the flow chart and/or block diagram and the combination of flow and/or block in the flow chart and/or block diagram can be implemented by computer executable instructions. These computer executable instructions can be provided to a processor of a general purpose computer, a special purpose computer, an embedded processor or other programmable data processing device to generate a machine such that instructions executed by a processor of a computer or other programmable data processing device generate a device for implementing functions specified in one or more flows in the flow charts and/or one or more blocks in the block diagrams.

These processor executable instructions can also be stored in a processor readable memory that can guide a computer or other programmable data processing device to operate in a specific way, and the instructions stored in the processor readable memory generate a manufacture including an instruction device that implements the functions specified in one or more flows in the flow charts and/or one or more blocks in the block diagrams.

These processor executable instructions can also be loaded into a computer or other programmable data processing device to enable a series of operating steps to be executed on a computer or other programmable device to generate a computer implemented process, and instructions executed on the computer or other programmable device provide steps for implementing functions specified in one or more flows in the flow charts and/or one or more blocks in the block diagrams.

It should be noted that those skilled in the art can make various changes and modifications to the present application without departing from the scope of the present application. If these changes and modifications on the present application are within the scope of the claims of the present application and their equivalent solutions, the present application is also intended to include these changes and modifications.

What is claimed is:

1. A signal transmission method, comprising:
   determining at least one of a first determination mode or a second determination mode, wherein the first determination mode is a mode for determining a first sounding reference signal (SRS) transmission corresponding to an uplink signal, and the second determination mode is a mode for determining a first antenna port corresponding to the uplink signal; and
   transmitting at least one of the first determination mode or the second determination mode to a user equipment (UE), the first determination mode is used for determining the first SRS transmission, or the second determination mode is used for determining the first antenna port, or the first determination mode is used for determining the first SRS transmission and the second determination mode is used for determining the first antenna port, and the uplink signal is transmitted according to at least one of the first SRS transmission or the first antenna port;
   wherein the second determination mode comprises:
   determining the first antenna port according to an antenna port for one or more SRS transmissions of a fourth SRS resource set, or an antenna port for one or more SRS transmissions of a fifth SRS resource set, or an antenna port for one or more SRS transmissions of a fourth SRS resource set and an antenna port for one or more SRS transmissions of a fifth SRS resource set; or
   taking an antenna port for fifth SRS transmission as the first antenna port; or
   taking an antenna port for one or more SRS transmissions of a sixth SRS resource set as the first antenna port;
   wherein the fourth SRS resource set is an SRS resource set with a given type that unmatched with a transmission mode of the uplink signal;
   the fifth SRS resource set is an SRS resource set matched with the transmission mode of the uplink signal;
   the fifth SRS transmission is the most recent SRS transmission of an SRS resource indicated by SRI in DCI which schedules the uplink signal, where the SRS resource is prior to a PDCCH carrying the DCI; and
   the sixth SRS resource set is an SRS resource set indicated by SRS resource set indication information transmitted by a network device.

2. The method of claim 1, wherein the first SRS transmission is one or more SRS transmissions of an SRS resource indicated by SRS resource indication information in scheduling information for the uplink signal.

3. The method of claim 1, wherein the first determination mode comprises:
   determining the first SRS transmission according to one or more SRS transmissions of a first SRS resource set, or one or more SRS transmissions of a second SRS resource set, or one or more SRS transmissions of a first SRS resource set and one or more SRS transmissions of a second SRS resource set; or
   taking a second SRS transmission as the first SRS transmission; or
   taking one or more SRS transmissions of a third SRS resource set as the first SRS transmission;
   wherein the first SRS resource set is an SRS resource set with a given type that unmatched with a transmission mode of the uplink signal;
   the second SRS resource set is an SRS resource set matched with the transmission mode of the uplink signal;
   the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and
   the third SRS resource set is an SRS resource set indicated by SRS resource set indication information transmitted by a network device.

4. The method of claim 3, wherein the determining the first SRS transmission according to one or more SRS transmissions of the first SRS resource set, or one or more SRS transmissions of the second SRS resource set, or one or more SRS transmissions of the first SRS resource set and one or more SRS transmissions of the second SRS resource set comprises one or more of:
   determining the first SRS transmission from the one or more SRS transmissions of the first SRS resource set in case that the network device configures the first SRS resource set and the second SRS resource set for the UE simultaneously; or determining the first SRS transmission from SRS transmission of the one or more same SRS resources in the first SRS resource set in case that the network device configures the first SRS resource set and the second SRS resource set for the UE simultaneously, and the first SRS resource set and the second SRS resource set include one or more same SRS resources; or taking a third SRS transmission as the first SRS transmission; or taking a fourth SRS transmission as the first SRS transmission;

wherein the third SRS transmission is an SRS transmission of SRS resource indicated by SRI in DCI which schedules the uplink signal in the most recent transmission of the second SRS resource set, where the second SRS resource set is prior to a PDCCH carrying the DCI; and the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

5. The method of claim 3, wherein the transmission mode of the uplink signal includes at least one of a codebook based transmission scheme or a non-codebook based transmission scheme;
   an SRS resource set matched with the codebook based transmission scheme is an SRS resource set with usage set to codebook; and
   an SRS resource set matched with the non-codebook based transmission scheme is an SRS resource set with usage set to non-codebook.

6. The method of claim 1, wherein the determining the first antenna port according to the antenna port for one or more SRS transmissions of the fourth SRS resource set, or the antenna port for one or more SRS transmissions of the fifth SRS resource set, or the antenna port for one or more SRS transmissions of the fourth SRS resource set and the antenna port for one or more SRS transmissions of the fifth SRS resource set, comprises one or more of:
   determining the first antenna port from the antenna port for the one or more SRS transmissions of the fourth SRS resource set in case that the network device configures the fourth SRS resource set and the fifth SRS resource set for the UE simultaneously; or
   determining the first antenna port from an antenna port for SRS transmission of the one or more same SRS resources in the fourth SRS resource set in case that the network device configures the fourth SRS resource set and the fifth SRS resource set for the UE simultaneously, and the fourth SRS resource set and the fifth SRS resource set comprise one or more same SRS resources;
   taking an antenna port for sixth SRS transmission as the first antenna port; or
   taking an antenna port for seventh SRS transmission as the first antenna port;
   wherein the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and
   the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

7. The method of claim 1, wherein the transmitting the at least one of the first determination mode or the second determination mode to the UE comprises:
   transmitting the at least one of the first determination mode or the second determination mode to the UE through a first indication signaling;
   the signal transmission method further comprises:
   determining first information for indicating SRS resource set; and
   transmitting the first information to the UE through the first indication signaling or a second indication signaling, wherein the second indication signaling is different from the first indication signaling.

8. The method of claim 1, further comprising:
   transmitting third indication information to the UE, wherein the third indication information is used for indicating a bit width of SRI information, and the SRI is used for indicating SRS resource for the first SRS transmission, or is used for indicating SRS resource for the first antenna port, or is used for indicating SRS resource for the first SRS transmission and indicating SRS resource for the first antenna port.

9. A signal transmission method, comprising:
   receiving at least one of a first determination mode or a second determination mode transmitted by a network device, wherein the first determination mode is a mode for determining a first sounding reference signal (SRS) transmission corresponding to an uplink signal, and the second determination mode is a mode for determining a first antenna port corresponding to the uplink signal;
   determining the first SRS transmission according to the first determination mode, or determining the first antenna port according to the second determination mode, or determining the first SRS transmission according to the first determination mode and determining the first antenna port according to the second determination mode; and
   transmitting the uplink signal according to at least one of the first SRS transmission or the first antenna port;
   wherein the determining the first antenna port according to the second determination mode comprises:
   determining the first antenna port according to an antenna port for one or more SRS transmissions of a fourth SRS resource set, or an antenna port for one or more SRS transmissions of a fifth SRS resource set, or an antenna port for one or more SRS transmissions of a fourth SRS resource set and an antenna port for one or more SRS transmissions of a fifth SRS resource set; or
   taking an antenna port for fifth SRS transmission as the first antenna port; or
   taking an antenna port for one or more SRS transmissions of a sixth SRS resource set as the first antenna port;
   wherein the fourth SRS resource set is an SRS resource set with a given type that unmatched with a transmission mode of the uplink signal;
   the fifth SRS resource set is an SRS resource set matched with the transmission mode of the uplink signal;
   the fifth SRS transmission is the most recent SRS transmission of an SRS resource indicated by SRI in DCI which schedules the uplink signal, where the SRS resource is prior to a PDCCH carrying the DCI; and
   the sixth SRS resource set is an SRS resource set indicated by SRS resource set indication information transmitted by a network device.

10. The method of claim 9, wherein the first SRS transmission is one or more SRS transmissions of an SRS resource indicated by SRS resource indication information in scheduling information for the uplink signal.

11. The method of claim 9, wherein the determining the first SRS transmission according to the first determination mode comprises:
   determining the first SRS transmission according to one or more SRS transmissions of a first SRS resource set, or one or more SRS transmissions of a second SRS resource set, or one or more SRS transmissions of a first SRS resource set and one or more SRS transmissions of a second SRS resource set; or
   taking a second SRS transmission as the first SRS transmission; or
   taking one or more SRS transmissions of a third SRS resource set as the first SRS transmission;
   wherein the first SRS resource set is an SRS resource set with a given type that unmatched with a transmission mode of the uplink signal;
   the second SRS resource set is an SRS resource set matched with the transmission mode of the uplink signal;
   the second SRS transmission is the most recent SRS transmission of an SRS resource indicated by SRS resource indicator (SRI) in downlink control information (DCI), where the SRS resource is prior to a physical downlink control channel (PDCCH) carrying the DCI which schedules the uplink signal; and
   the third SRS resource set is an SRS resource set indicated by SRS resource set indication information transmitted by the network device.

12. The method of claim 11, wherein the determining the first SRS transmission according to one or more SRS transmissions of the first SRS resource set, or one or more SRS transmissions of the second SRS resource set, or one or more SRS transmissions of the first SRS resource set and one or more SRS transmissions of the second SRS resource set, comprises one or more of:
   determining the first SRS transmission from the one or more SRS transmissions of the first SRS resource set in case that the network device configures no second SRS resource set for a user equipment (UE); or
   determining the first SRS transmission from the one or more SRS transmissions of the first SRS resource set in case that the network device configures the first SRS resource set and the second SRS resource set for a user equipment (UE) simultaneously; or
   determining the first SRS transmission from SRS transmission of the one or more same SRS resources in the first SRS resource set in case that the network device configures the first SRS resource set and the second SRS resource set for a user equipment (UE) simultaneously, and the first SRS resource set and the second SRS resource set include one or more same SRS resources; or
   taking a third SRS transmission as the first SRS transmission; or
   taking a fourth SRS transmission as the first SRS transmission;
   wherein the third SRS transmission is an SRS transmission of SRS resource indicated by SRI in DCI which schedules the uplink signal in the most recent transmission of the second SRS resource set, where the second SRS resource set is prior to a PDCCH carrying the DCI; and
   the fourth SRS transmission is an SRS transmission of a lastly or most recently transmitted SRS resource set of the first SRS resource set and the second SRS resource set, where the lastly or most recently transmitted SRS resource set is prior to the PDCCH carrying the DCI which schedules the uplink signal.

13. The method of claim 11, wherein the transmission mode of the uplink signal includes at least one of a codebook based transmission scheme or a non-codebook based transmission scheme;
   an SRS resource set matched with the codebook based transmission scheme is an SRS resource set with usage set to codebook; and
   an SRS resource set matched with the non-codebook based transmission scheme is an SRS resource set with usage set to non-codebook.

14. The method of claim 9, wherein the determining the first antenna port according to the antenna port for one or more SRS transmissions of the fourth SRS resource set, or the antenna port for one or more SRS transmissions of the fifth SRS resource set, or the antenna port for one or more SRS transmissions of the fourth SRS resource set and the antenna port for one or more SRS transmissions of the fifth SRS resource set, comprises:
   determining the first antenna port from the antenna port for the one or more SRS transmissions of the fourth SRS resource set in case that the network device configures no fifth SRS resource set for a user equipment (UE) or
   determining the first antenna port from the antenna port for the one or more SRS transmissions of the fourth SRS resource set in case that the network device configures the fourth SRS resource set and the fifth SRS resource set for a user equipment (UE) simultaneously; or
   determining the first antenna port from the antenna port for the one or more SRS transmissions of the fifth SRS resource set in case that the network device configures no fourth SRS resource set for a user equipment (UE) or
   determining the first antenna port from an antenna port for SRS transmission of the one or more same SRS resources in the fourth SRS resource set in case that the network device configures the fourth SRS resource set and the fifth SRS resource set for a user equipment (UE) simultaneously, and the fourth SRS resource set and the fifth SRS resource set comprise one or more same SRS resources; or
   taking an antenna port for sixth SRS transmission as the first antenna port; or
   taking an antenna port for seventh SRS transmission as the first antenna port;
   wherein the sixth SRS transmission is an SRS transmission of SRS resource indicated by SRI in DCI which schedules the uplink signal in the most recent transmission of the fifth SRS resource set, where the fifth SRS resource set is prior to a PDCCH carrying the DCI; and
   the seventh SRS transmission is an SRS transmission of a lastly or most recently transmitted SRS resource set of the fourth SRS resource set and the fifth SRS resource set, where the lastly or most recently transmitted SRS resource set is prior to the PDCCH carrying the DCI which schedules the uplink signal.

15. The method of claim 9, wherein the receiving the at least one of the first determination mode or the second determination mode transmitted by the network device comprises:

receiving the at least one of the first determination mode or the second determination mode transmitted by the network device through a first indication signaling;

the signal transmission method further comprising:

receiving first information for indicating SRS resource set transmitted by the network device through the first indication signaling or a second indication signaling, wherein the second indication signaling is different from the first indication signaling.

16. The method of claim 9, further comprising:

receiving third indication information transmitted by the network device, wherein the third indication information is used for indicating a bit width of SRI information; and determining the bit width of the SRI information according to the third indication information;

wherein the SRI is used for indicating SRS resource for the first SRS transmission, or is used for indicating SRS resource for the first antenna port, or is used for indicating SRS resource for the first SRS transmission and SRS resource for the first antenna port.

17. A signal transmission apparatus, comprising: a memory, a transceiver and a processor;

the memory is configured to store a computer program; the transceiver is configured to transmit and receive data under a control of the processor; and the processor is configured to read the computer program in the memory and perform the method of claim 1.

18. A signal transmission apparatus, comprising: a memory, a transceiver and a processor;

the memory is configured to store a computer program; the transceiver is configured to transmit and receive data under a control of the processor; and the processor is configured to read the computer program in the memory and perform the following operations of:

receiving at least one of a first determination mode or a second determination mode transmitted by a network device, wherein the first determination mode is a mode for determining a first sounding reference signal (SRS) transmission corresponding to an uplink signal, and the second determination mode is a mode for determining a first antenna port corresponding to the uplink signal;

determining the first SRS transmission according to the first determination mode, or determining the first antenna port according to the second determination mode, or determining the first SRS transmission according to the first determination mode and determining the first antenna port according to the second determination mode; and transmitting the uplink signal according to at least one of the first SRS transmission or the first antenna port;

wherein the determining the first antenna port according to the second determination mode comprises:

determining the first antenna port according to an antenna port for one or more SRS transmissions of a fourth SRS resource set, or an antenna port for one or more SRS transmissions of a fifth SRS resource set, or an antenna port for one or more SRS transmissions of a fourth SRS resource set and an antenna port for one or more SRS transmissions of a fifth SRS resource set; or taking an antenna port for fifth SRS transmission as the first antenna port; or taking an antenna port for one or more SRS transmissions of a sixth SRS resource set as the first antenna port;

wherein the fourth SRS resource set is an SRS resource set with a given type that unmatched with a transmission mode of the uplink signal;

the fifth SRS resource set is an SRS resource set matched with the transmission mode of the uplink signal;

the fifth SRS transmission is the most recent SRS transmission of an SRS resource indicated by SRI in DCI which schedules the uplink signal, where the SRS resource is prior to a PDCCH carrying the DCI; and the sixth SRS resource set is an SRS resource set indicated by SRS resource set indication information transmitted by a network device.

* * * * *